(12) United States Patent
Beers et al.

(10) Patent No.: US 12,353,442 B2
(45) Date of Patent: Jul. 8, 2025

(54) DETECTING ANOMALIES IN VISUALIZATIONS

(71) Applicant: Tableau Software, LLC, Seattle, WA (US)

(72) Inventors: Andrew C. Beers, Seattle, WA (US); Eric Roy Brochu, Vancouver (CA); Rachel Stern Kalmar, Cambridge, MA (US); Hon To Ming, Vancouver (CA); David John Mosimann, New Westminster (CA); Leiling Tao, Burnaby (CA); Lu Yu, New Westminster (CA)

(73) Assignee: Tableau Software, LLC, Seattle, WA (US)

( * ) Notice: Subject to any disclaimer, the term of this patent is extended or adjusted under 35 U.S.C. 154(b) by 223 days.

(21) Appl. No.: 17/588,174

(22) Filed: Jan. 28, 2022

(65) Prior Publication Data

US 2023/0143734 A1    May 11, 2023

Related U.S. Application Data

(60) Provisional application No. 63/277,563, filed on Nov. 9, 2021.

(51) Int. Cl.
*G06F 16/28* (2019.01)
*G06F 11/07* (2006.01)
*G06N 20/20* (2019.01)

(52) U.S. Cl.
CPC ........ *G06F 16/287* (2019.01); *G06F 11/0784* (2013.01); *G06N 20/20* (2019.01)

(58) Field of Classification Search
CPC .... G06F 16/287; G06F 11/0784; G06N 20/20
See application file for complete search history.

(56) References Cited

U.S. PATENT DOCUMENTS 7,010,364 B1    3/2006  Singh et al.
8,099,674 B2    1/2012  Mackinlay et al.
(Continued)

FOREIGN PATENT DOCUMENTS

JP    2007-249354 A    9/2007
JP    2008-217480 A    9/2008
(Continued)

OTHER PUBLICATIONS

Office Communication for U.S. Appl. No. 16/732,027 mailed Jan. 17, 2023, pp. 1-5.
(Continued)

*Primary Examiner* — Etienne P Leroux
*Assistant Examiner* — Husam Turki Samara
(74) *Attorney, Agent, or Firm* — Morgan, Lewis & Bockius LLP

(57) ABSTRACT

Embodiments are directed to managing visualizations of data. Visualizations to monitor may be determined based on metrics associated with the monitored visualizations. Mark values may be sampled from each monitored visualization such that the sampled mark values may be stored with a timestamp. If an amount of the sampled mark values for a monitored visualization exceeds a threshold value mark models may be trained to classify a portion of the sampled mark values associated with the monitored visualization such that the mark models may predict ranges of values for the classified mark values associated with the monitored visualization. If the portion of the classified mark values associated with the monitored visualization has a value outside of the predicted range values, indicating that the monitored visualization may be associated with an anomalous mark value.

21 Claims, 11 Drawing Sheets

(56) References Cited

U.S. PATENT DOCUMENTS

| | | |
|---|---|---|
| 8,589,811 B2 | 11/2013 | Gotz |
| 8,983,994 B2 | 3/2015 | Neels et al. |
| 9,335,911 B1 | 5/2016 | Elliot et al. |
| 9,361,320 B1 | 6/2016 | Vijendra et al. |
| 9,418,105 B2 | 8/2016 | Buchheit et al. |
| 9,613,086 B1 | 4/2017 | Sherman |
| 9,779,147 B1 | 10/2017 | Sherman et al. |
| 10,460,332 B1 | 10/2019 | Kujat et al. |
| 10,552,513 B1 | 2/2020 | Harkare |
| 10,572,544 B1 | 2/2020 | Zhang et al. |
| 10,572,804 B1 | 2/2020 | Hilley |
| 10,572,859 B1 | 2/2020 | Evans et al. |
| 10,572,925 B1 | 2/2020 | Roy Chowdhury et al. |
| 10,592,525 B1 | 3/2020 | Khante et al. |
| 10,642,723 B1 | 5/2020 | Krishnamoorthy |
| 10,705,695 B1 | 7/2020 | Porath et al. |
| 10,719,332 B1 | 7/2020 | Dwivedi et al. |
| 10,775,976 B1 | 9/2020 | Abdul-Jawad et al. |
| 10,929,415 B1 | 2/2021 | Shcherbakov et al. |
| 10,963,347 B1 | 3/2021 | Chen et al. |
| 11,074,301 B2 | 7/2021 | Williams et al. |
| 11,232,506 B1 | 1/2022 | Zielnicki |
| 11,537,942 B1 * | 12/2022 | Vogler-Ivashchanka .................... G06N 20/00 |
| 2005/0134589 A1 | 6/2005 | Heer et al. |
| 2007/0136285 A1 | 6/2007 | Cormode et al. |
| 2008/0168135 A1 | 7/2008 | Redlich et al. |
| 2009/0105984 A1 | 4/2009 | Wen et al. |
| 2011/0137850 A1 | 6/2011 | Mourey et al. |
| 2011/0296309 A1 | 12/2011 | Ngan |
| 2011/0302110 A1 | 12/2011 | Beers et al. |
| 2012/0229466 A1 | 9/2012 | Richie et al. |
| 2012/0233182 A1 | 9/2012 | Baudel et al. |
| 2013/0091465 A1 | 4/2013 | Kikin-Gil et al. |
| 2013/0103677 A1 | 4/2013 | Chakra et al. |
| 2013/0204894 A1 | 8/2013 | Faith et al. |
| 2013/0300463 A1 | 11/2013 | Gemmeke et al. |
| 2014/0019443 A1 | 1/2014 | Golshan |
| 2014/0032548 A1 | 1/2014 | Gilra et al. |
| 2014/0059017 A1 | 2/2014 | Chaney et al. |
| 2014/0074889 A1 | 3/2014 | Neels et al. |
| 2014/0156223 A1 | 6/2014 | Toomre et al. |
| 2014/0344008 A1 | 11/2014 | Gammage et al. |
| 2015/0112894 A1 | 4/2015 | Lingappa |
| 2015/0278214 A1 | 10/2015 | Anand et al. |
| 2016/0034305 A1 | 2/2016 | Shear et al. |
| 2016/0092408 A1 | 3/2016 | Lagerblad et al. |
| 2016/0092576 A1 | 3/2016 | Quercia et al. |
| 2016/0103908 A1 | 4/2016 | Fletcher et al. |
| 2016/0196534 A1 | 7/2016 | Jarrett et al. |
| 2016/0307210 A1 | 10/2016 | Agarwal et al. |
| 2016/0307233 A1 | 10/2016 | Pan et al. |
| 2016/0350950 A1 | 12/2016 | Ritchie et al. |
| 2016/0357829 A1 | 12/2016 | Fung et al. |
| 2016/0364770 A1 | 12/2016 | Denton et al. |
| 2017/0031449 A1 | 2/2017 | Karsten et al. |
| 2017/0046404 A1 * | 2/2017 | Shim .................... G06F 16/9535 |
| 2017/0061659 A1 | 3/2017 | Puri et al. |
| 2017/0069118 A1 | 3/2017 | Stewart |
| 2017/0124617 A1 | 5/2017 | Spoelstra et al. |
| 2017/0132489 A1 | 5/2017 | Simgi |
| 2017/0140118 A1 | 5/2017 | Haddad et al. |
| 2017/0154088 A1 | 6/2017 | Sherman |
| 2017/0154089 A1 | 6/2017 | Sherman |
| 2017/0220633 A1 | 8/2017 | Porath et al. |
| 2017/0308913 A1 | 10/2017 | Chao et al. |
| 2018/0004363 A1 | 1/2018 | Tompkins |
| 2018/0032492 A1 | 2/2018 | Altshuller et al. |
| 2018/0039399 A1 | 2/2018 | Kaltegaertner et al. |
| 2018/0121035 A1 | 5/2018 | Filippi et al. |
| 2018/0129369 A1 | 5/2018 | Kim et al. |
| 2018/0210936 A1 | 7/2018 | Reynolds et al. |
| 2018/0232405 A1 | 8/2018 | Samara et al. |
| 2018/0267676 A1 | 9/2018 | Glueck et al. |
| 2018/0285772 A1 | 10/2018 | Gopalan |
| 2018/0343321 A1 | 11/2018 | Chang |
| 2019/0012553 A1 | 1/2019 | Maruchi et al. |
| 2019/0026681 A1 | 1/2019 | Polli et al. |
| 2019/0043506 A1 | 2/2019 | Rivkin et al. |
| 2019/0102425 A1 | 4/2019 | Obeidat |
| 2019/0108272 A1 | 4/2019 | Talbot et al. |
| 2019/0122132 A1 * | 4/2019 | Rimini .................... G06Q 50/06 |
| 2019/0129964 A1 | 5/2019 | Corbin, II et al. |
| 2019/0130512 A1 | 5/2019 | Kuhn |
| 2019/0179621 A1 | 6/2019 | Salgado et al. |
| 2019/0188333 A1 | 6/2019 | Williams et al. |
| 2019/0213608 A1 | 7/2019 | Ouyang et al. |
| 2019/0339688 A1 | 11/2019 | Cella et al. |
| 2019/0355447 A1 | 11/2019 | Barkol et al. |
| 2020/0012939 A1 | 1/2020 | Hu et al. |
| 2020/0019546 A1 | 1/2020 | Luo et al. |
| 2020/0050636 A1 | 2/2020 | Datla et al. |
| 2020/0066397 A1 | 2/2020 | Rai et al. |
| 2020/0104731 A1 | 4/2020 | Oliner et al. |
| 2020/0133448 A1 * | 4/2020 | Beran ................. G06F 3/04883 |
| 2020/0134545 A1 | 4/2020 | Appel et al. |
| 2020/0160211 A1 * | 5/2020 | Kumar .................... G06N 3/08 |
| 2020/0233559 A1 | 7/2020 | Rueter et al. |
| 2020/0250472 A1 | 8/2020 | Abhyankar et al. |
| 2020/0250562 A1 | 8/2020 | Bly |
| 2020/0311680 A1 | 10/2020 | Wahl et al. |
| 2020/0320462 A1 | 10/2020 | Wang et al. |
| 2020/0333777 A1 | 10/2020 | Maruyama |
| 2020/0372472 A1 | 11/2020 | Kenthapadi et al. |
| 2020/0403944 A1 | 12/2020 | Joshi et al. |
| 2020/0410001 A1 | 12/2020 | Sarkissian |
| 2021/0011961 A1 | 1/2021 | Guan et al. |
| 2021/0019338 A1 | 1/2021 | Grampurohit et al. |
| 2021/0019357 A1 | 1/2021 | Bennett et al. |
| 2021/0049143 A1 | 2/2021 | Jacinto et al. |
| 2021/0081377 A1 | 3/2021 | Polleri et al. |
| 2021/0088418 A1 | 3/2021 | Sato et al. |
| 2021/0110288 A1 | 4/2021 | Poothiyot et al. |
| 2021/0133632 A1 | 5/2021 | Elprin et al. |
| 2021/0194783 A1 | 6/2021 | Sinha et al. |
| 2021/0313070 A1 | 10/2021 | Toyoshiba et al. |
| 2021/0365856 A1 | 11/2021 | Mukherjee et al. |
| 2022/0012626 A1 * | 1/2022 | Ben-Itzhak ........ G06V 10/7753 |
| 2022/0019947 A1 | 1/2022 | Mitelman |
| 2022/0147540 A1 | 5/2022 | Rossi et al. |
| 2022/0198263 A1 * | 6/2022 | Guo .................... G06Q 50/01 |
| 2022/0317979 A1 | 10/2022 | Araujo Soares et al. |
| 2023/0040578 A1 * | 2/2023 | Porter .................... G06N 20/10 |

FOREIGN PATENT DOCUMENTS

| | | |
|---|---|---|
| JP | 2009-534752 A | 9/2009 |
| JP | 2017-174176 A | 9/2017 |
| JP | 2021-6991 A | 1/2021 |
| WO | 2014010071 A1 | 1/2014 |
| WO | 2015030214 A1 | 3/2015 |

OTHER PUBLICATIONS

Office Communication for U.S. Appl. No. 16/672,130 mailed Feb. 13, 2023, pp. 1-34.

Office Communication for U.S. Appl. No. 17/866,091 mailed Mar. 2, 2023, pp. 1-30.

Office Communication for U.S. Appl. No. 17/158,911 mailed Mar. 8, 2023, pp. 1-6.

Office Communication for U.S. Appl. No. 16/732,027 mailed Mar. 8, 2023, pp. 1-9.

Office Communication for U.S. Appl. No. 17/588,145 mailed Apr. 26, 2023, pp. 1-16.

Office Communication for U.S. Appl. No. 17/158,911 mailed Apr. 27, 2023, pp. 1-40.

Office Communication for U.S. Appl. No. 17/014,882 mailed Jun. 9, 2022, pp. 1-8.

Office Communication for U.S. Appl. No. 16/732,027 mailed Jun. 14, 2022, pp. 1-18.

Office Communication for U.S. Appl. No. 17/158,911 mailed Jun. 28, 2022, pp. 1-29.

(56) References Cited

OTHER PUBLICATIONS

Office Communication for U.S. Appl. No. 16/672,130 mailed Aug. 2, 2022, pp. 1-5.
Office Communication for U.S. Appl. No. 16/944,085 mailed Aug. 30, 2022, pp. 1-9.
Office Communication for U.S. Appl. No. 16/944,085 mailed Sep. 9, 2022, pp. 1-2.
Office Communication for U.S. Appl. No. 16/672,130 mailed Sep. 13, 2022, pp. 1-35.
Office Communication for U.S. Appl. No. 17/014,882 mailed Sep. 28, 2022, pp. 1-11.
Office Communication for U.S. Appl. No. 16/915,963 mailed Oct. 5, 2022, pp. 1-7.
Negash, Solomon, "Business Intelligence," Communications of the Association for Information Systems, 2004, vol. 13, pp. 177-195.
Eckerson, Wayne W., "Performance Dashboards Measuring, Monitoring, and Managing Your Business," Business Book Summaries, 2012, pp. 1-11.
Lizotte-Latendresse, Simon et al., "Implementing self-service business analytics supporting lean manufacturing: A state-of-the-art review," 16th IFAC Symposium-Incom, 2018, pp. 1143-1148.
Gröger, Christoph et al., "The Operational Process Dashboard for Manufacturing," SciVerse ScienceDirect, Procedia CIRP 7, 2013, pp. 205-210.
Yigitbasioglu, Ogan M. et al., "A review of dashboards in performance management: Implications for design and research," International Journal of Accounting Information Systems, 2012, vol. 13, pp. 41-59.
Adam, Frédéric et al., "Developing Practical Decision Support Tools Using Dashboards of Information," in: Handbook on Decision Support Systems 2. International Handbooks Information System, Springer, Berlin, Heidelberg, 2008, pp. 151-173.
Passlick, Jens et al., "A Self-Service Supporting Business Intelligence and Big Data Analytics Architecture," Proceedings of the 13th International Conference on Wirtschaftsinformatik, 2017, pp. 1126-1140.
Shneiderman, Ben, "The Eyes Have It: A Task by Data Type Taxonomy for Information Visualizations," Proc. Visual Languages, 1996, pp. 1-9.
Alpar, Paul et al., "Self-Service Business Intelligence," Business & Information Systems Engineering, 2016, vol. 58, pp. 151-155.
Kaur, Pawandeep et al., "A Review on Visualization Recommendation Strategies," in Proceedings of the 12th International Joint Conference on Computer Vision, Imaging and Computer Graphics Theory and Applications, 2017, vol. 3, pp. 266-273.
Hoang, Duong Thi Anh et al., "Dashboard by-Example: A Hypergraph-based Approach to On-demand Data warehousing systems," IEEE International Conference on Systems, Man, and Cybernetics, 2012, pp. 1853-1858.
Zhang, Shuo et al., "Ad Hoc Table Retrieval using Semantic Similarity," IW3C2, Creative Commons CC by 4.0 License, 2018, pp. 1553-1562.
Key, Alicia et al., "VizDeck: Self-Organizing Dashboards for Visual Analytics," SIGMOD International Conference on Management of Data, 2012, pp. 681-684.
Mackinlay, Jock, "Automating the Design of Graphical Presentations of Relational Information," ACM Transactions on Graphics, 1986, vol. 5, No. 2, pp. 110-141.
Touma, Rizkallah et al., "Supporting Data Integration Tasks with Semi-Automatic Ontology Construction," DOLAP '15: Proceedings of the ACM Eighteenth International Workshop on Data Warehousing and OLAP, 2015, pp. 89-98.
Mazumdar, Suvodeep et al., "A Knowledge Dashboard for Manufacturing Industries," ESWC 2011 Workshops, LNCS 7117, 2012, pp. 112-124.
Matera, Maristella et al., "PEUDOM: A Mashup Platform for the End User Development of Common Information Spaces," ICWE 2013, LNCS 7977, 2013, pp. 494-497.

Theorin, Alfred et al., "An Event-Driven Manufacturing Information System Architecture," IFAC/IEEE Symposium on Information Control Problems in Manufacturing, 2015, pp. 1-9.
Lennerholt, Christian et al., "Implementation Challenges of Self Service Business Intelligence: A Literature Review," Proceedings of the 51st Hawaii International Conference on System Sciences, 2018, pp. 5055-5063.
Elias, Micheline et al., "Exploration Views: Understanding Dashboard Creation and Customization for Visualization Novices," Interact 2011, Part IV, LNCS 6949, 2011, pp. 274-291.
Buccella, Agustina et al., "Ontology-Based Data Integration Methods: A Framework for Comparison," Revista Colombiana de Computación, 2005, vol. 6, No. 1, pp. 1-24.
Roberts, Jonathan C., "State of the Art: Coordinated & Multiple Views in Exploratory Visualization," Proceedings of the 5th International Conference on Coordinated & Multiple Views in Exploratory Visualization, IEEE Computer Society Press, 2007, pp. 61-71.
Palpanas, Themis et al., "Integrated model-driven dashboard development," Information Systems Frontiers, 2007, vol. 9, pp. 1-14.
Resnick, Marc L., "Building The Executive Dashboard," Proceedings of the Human Factors and Ergonomics Society 47th Annual Meeting, 2003, pp. 1639-1643.
Sarikaya, Alper et al., "What Do We Talk About When We Talk About Dashboards?," IEEE Transactions on Visualization and Computer Graphics, 2018, pp. 1-11.
Boury-Brisset, Anne-Claire, "Ontology-based Approach for Information Fusion," Proceedings of the Sixth International Conference on Information Fusion, 2003, vol. 1, pp. 522-529.
Park, Laurence A. F. et al., "A Blended Metric for Multi-label Optimisation and Evaluation," ECML/PKDD, 2018, pp. 1-16.
Kintz, Maximilien, "A Semantic Dashboard Description Language for a Process-oriented Dashboard Design Methodology," 2nd International Workshop on Mode-based Interactive Ubiquitous Systems, 2012, pp. 1-6.
Bergamaschi, Sonia et al., "A Semantic Approach to ETL Technologies," Data & Knowledge Engineering, 2011, pp. 1-24.
Office Communication for U.S. Appl. No. 16/368,390 mailed Mar. 2, 2020, pp. 1-8.
International Search Report and Written Opinion for International Patent Application No. PCT/US2020/038157 mailed Oct. 6, 2020, pp. 1-8.
International Search Report and Written Opinion for International Patent Application No. PCT/US2020/057780 mailed Feb. 2, 2021, pp. 1-8.
Barowy, Daniel W. et al., "ExceLint: Automatically Finding Spreadsheet Formula Errors," in Proceedings of the ACM Programming Languages 2, OOPSLA, 2018, Article 148, pp. 1-26.
Barowy, Daniel W. et al., "CheckCell: Data Debugging for Spreadsheets," ACM SIGPLAN Notices, 2014, vol. 49, Iss. 10, pp. 507-523.
Donaldson, Alastair F. et al., "Automated Testing of Graphics Shader Compilers," in Proceedings of the ACM Programming Languages 1, OOPSLA, 2017, Article 93, pp. 1-29.
Dragicevic, Pierre et al., "Increasing the Transparency of Research Papers with Explorable Multiverse Analyses," in Proceedings of the ACM CHI Conference on Human Factors in Computing Systems, 2019, Glasgow, United Kingdom, pp. 1-16.
Gotz, David et al., "Visualization Model Validation via Inline Replication," Information Visualization, 2019, pp. 405-425.
Guderlei, Ralph et al., "Statistical Metamorphic Testing—Testing Programs With Random Output by Means of Statistical Hypothesis Tests and Metaphoric Testing," in Seventh International Conference on Quality Software, IEEE, 2007, pp. 404-409.
Guo, Yue et al., "What You See is Not What You Get!: Detecting Simpson's Paradoxes During Data Exploration," in ACM SIGMOD Workshop on Human-in-the-Loop Data Analytics (HILDA), 2017, Article 2, pp. 1-5.
Hynes, Nick et al., "The Data Linter: Lightweight, Automated Sanity Checking for ML Data Sets," in NIPS: Workshop on Systems for ML and Open Source Software, 2017, pp. 1-7.
Kindlmann, Gordon et al., "An Algebraic Process for Visualization Design," IEEE Transactions on Visualization and Computer Graphics, 2014, vol. 20, No. 12, pp. 2181-2190.

(56) References Cited

OTHER PUBLICATIONS

Kirby, Robert M. et al., "The Need for Verifiable Visualization," IEEE Computer Graphics and Applications, 2008, vol. 28, No. 5, pp. 78-83.
McNutt, Andrew et al., "Linting for Visualization: Towards a Practical Automated Visualization Guidance System," in VisGuides: 2nd Workshop on the Creation, Curation, Critique and Conditioning of Principles and Guidelines in Visualization, 2018, pp. 1-14.
Muşlu, Kivanç et al., "Preventing Data Errors with Continuous Testing," in Proceedings of the 2015 International Symposium on Software Testing and Analysis, ACM, 2015, pp. 373-384.
Salimi, Babak et al., "Bias in OLAP Queries: Detection, Explanation, and Removal." In Proceedings of the 2018 International Conference on Management of Data, ACM, 2018, pp. 1021-1035.
Tang, Nan et al., "Towards Democratizing Relational Data Visualization," in Proceedings of the 2019 International Conference on Management of Data, ACM, 2019, pp. 2025-2030.
Wall, Emily et al., "Warning, Bias May Occur: A Proposed Approach to Detecting Cognitive Bias in Interactive Visual Analytics," in 2017 IEEE Conference on Visual Analytics Science and Technology (VAST), IEEE, 2017, pp. 104-115.
Wickham, Hadley et al., "Graphical Inference for Infovis," IEEE Transactions on Visualization and Computer Graphics 16, 2010, pp. 973-979.
Anand, Anushka et al., "Automatic Selection of Partitioning Variables for Small Mulitiple Displays," IEEE Transactions on Visualization and Computer Graphics, 2015, vol. 22, Iss. 1, pp. 669-677.
Anonymous, "Glitchart: When charts attack," https://glitch-chart.tumblr.com/, 2019, Accessed Feb. 5, 2020, p. 1.
Office Communication for U.S. Appl. No. 16/732,027 mailed Oct. 28, 2022, pp. 1-11.
Office Communication for U.S. Appl. No. 17/158,911 mailed Dec. 23, 2022, pp. 1-37.
Office Communication for U.S. Appl. No. 16/732,027 mailed Feb.y 25, 2022, pp. 1-6.
Office Communication for U.S. Appl. No. 16/944,085 mailed Mar. 17, 2022, pp. 1-6.
Office Communication for U.S. Appl. No. 16/903,967 mailed Mar. 18, 2022, pp. 1-11.
Office Communication for U.S. Appl. No. 16/944,064 mailed Mar. 22, 2022, pp. 1-10.
Office Communication for U.S. Appl. No. 16/915,963 mailed Mar. 23, 2022, pp. 1-4.
International Search Report and Written Opinion for International Patent Application No. PCT/US2022/012907 mailed Mar. 16, 2022, pp. 1-13.
Office Communication for U.S. Appl. No. 16/915,963 mailed Apr. 26, 2022, pp. 1-9.
Office Communication for U.S. Appl. No. 16/672,130 mailed May 19, 2022, pp. 1-33.
Office Communication for U.S. Appl. No. 16/672,130 mailed May 19, 2023, pp. 1-5.
Office Communication for U.S. Appl. No. 17/344,633 mailed Jun. 27, 2023, pp. 1-43.
Office Communication for U.S. Appl. No. 16/672,130 mailed Jul. 3, 2023, pp. 1-39.
Armstrong, Zan et al., "Visualizing Statistical Mix Effects and Simpson's Paradox," IEEE Transactions on Visualization and Computer Graphics, 2014, vol. 20, No. 12, pp. 2132-2141.
Barr, Earl T. et al., "The Oracle Problem in Software Testing: A Survey," IEEE Transactions on Software Engineering, 2015, vol. 41, No. 5, pp. 507-525.
Binnig, Carsten et al., "Toward Sustainable Insights, or Why Polygamy is Bad for You," in Proceedings of the 8th Biennial Conference on Innovative Data Systems Research, 2017, pp. 1-7.
Borland, David et al., "Contextual Visualization," IEEE Computer Graphics and Applications, 2018, vol. 38, No. 6, pp. 17-23.
Bresciani, Sabrina et al., "The Risks of Visualization," Identität und Vielfalt der Kommunikations-wissenschaft, 2009, pp. 1-22.
Bresciani, Sabrina et al., "The Pitfalls of Visual Representations: A Review and Classification of Common Errors Made While Designing and Interpreting Visualizations," SAGE Open, 2015, pp. 1-14.
Cairo, Alberto, "Graphic Lies, Misleading Visuals," in New Challenges for Data Design, Springer, 2015, pp. 103-116.
Chi, Ed Huai-Hsin, "A Taxonomy of Visualization Techniques Using the Data State Reference Model," in IEEE Symposium on Information Visualizations, 2000, pp. 69-75.
Chiw, Charisee et al., "DATm: Diderot's Automated Testing Model," in IEEE/ACM 12th International Workshop on Automation of Software Testing (AST), IEEE, 2017, pp. 45-51.
Cleveland, William S. et al., "Variables on Scatterplots Look More Highly Correlated When the Scales are Increased," Science, 1962, vol. 216, No. 4550, pp. 1138-1141.
Cockburn, Andy et al., "Hark No More: On the Preregistration of CHI Experiments," in Proceedings of the 2018 CHI Conference on Human Factors in Computing Systems, ACM, 2018, pp. 1-12.
Correll, Michael, "Ethical Dimensions of Visualization Research," in Proceedings of the 2019 CHI Conference on Human Factors in Computing Systems, ACM, 2019, pp. 1-13.
Correll, Michael et al., "Truncating the Y-Axis: Threat or Menace?," arXiv preprint arXiv:1907.02035, 2019. pp. 1-12.
Correll, Michael et al., "Surprise! Bayesian Weighting for De-Biasing Thematic Maps," IEEE Tranactions on Visualization and Computer Graphics, 2016, pp. 1-10.
Correll, Michael et al., "Black Hat Visualization," in IEEE VIS; Workshop on Dealing With Cognitive Biases in Visualizations, 2017, pp. 1-4.
Correll, Michael et al., "Looks Good to Me: Visualizations as Sanity Checks," IEEE Transactions on Visualizations and Computer Graphics, 2018, pp. 1-10.
Diehl, Alexandra et al., "VisGuides: A Forum for Discussing Visualization Guidelines," in Proceedings of the Eurographics/IEEE VGTC Conference on Visualization: Short Papers, Eurographics Asscociation, 2018, pp. 61-65.
D'Ignazio, Catherine et al., "Feminist Data Visualization," in IEEE VIS: Workshop on Visualization for the Digital Humanities (VIS4DH), 2016, pp. 1-5.
Dimara, Evanthia et al., "A Task-Based Taxonomy of Cognitive Biases for Information Visualization," IEEE Transactions on Visualization and Computer Graphics, 2018, pp. 1-21.
Dörk, Marian et al., "Critical InfoVis: Exploring the Politics of Visualization," in 2013 ACM SIGCHI Conference on Human Factors in Computing Systems, Extended Abstracts, 2013, pp. 2189-2198.
Efron, Bradley, "Bootstrap Methods: Another Look at the Jackknife," The Annals of Statistics, 1979, vol. 7, No. 1, pp. 1-26.
Filipov, Velitchko et al., "CV3: Visual Exploration, Assessment, and Comparison of CVs," in Computer Graphics Forum, Wiley Online Library, 2019, pp. 107-118.
Ford, Brian, "Write-Good: Naive Linter for English Prose," https://github.com/btford/write-good Accessed: Feb. 6, 2020, pp. 1-6.
Gelman, Andrew et al., "The garden of forking paths: Why multiple comparisons can be a problem, even when there is no "fishing expedition" or "p hacking" and the research hypothesis was posited ahead of time," Department of Statistics, Columbia University. 2013, pp. 1-17.
World Bank Group, "World Development Indicators," http://datatopics.worldbank.org/world-development-indicators/, 2020, pp. 1-6.
Haraway, Donna, "Situated Knowledges: The Science Question in Feminism and the Privilege of Partial Perspective," Feminist Studies, 1988, vol. 14, No. 3, pp. 575-599.
Heer, Jeffrey, "Agency plus automation: Designing artificial intelligence into interactive systems," in Proceedings of the National Academy of Sciences, 2019, vol. 116, No. 6, pp. 1844-1850.
Heer, Jeffrey, "Visualization is Not Enough," https://homes.cs.washington.edu/~jheer/talks/EuroVis2019-Capstone.pdf EuroVis Capstone, 2019, pp. 1-113.
Heer, Jeffrey et al., "Multi-Scale Banking to 45 Degrees," IEEE Transactions on Visualization and Computer Graphics, 2006, vol. 12, No. 5, pp. 701-708.

(56) References Cited

OTHER PUBLICATIONS

Hibbard, William L. et al., "A Lattice Model for Data Display," in Proceedings of the Conference on Visualization, IEEE Computer Society Press, 1994, pp. 310-317.
Hofmann, Heike et al., "Graphical Tests for Power Comparison of Competing Designs," IEEE Transactions on Visualization and Computer Graphics, 2012, vol. 18, No. 12, pp. 2441-2448.
Huff, Darrell, "How to Lie With Statistics," WW Norton & Company, 31st Printing, 1993, pp. 1-141.
Hullman, Jessica et al., "Visualization Rhetoric: Framing Effects in Narrative Visualization," IEEE Transaction on Visualization and Computer Graphics, 2011, vol. 17, No. 12, pp. 2231-2240.
Isenberg, Tobias et al., "A Systematic Review on the Practice of Evaluating Visualization," IEEE Transactions on Visualization and Computer Graphics, 2013, vol. 19, No. 12, pp. 2818-2827.
Jannah, Hassan M., "MetaReader: A Dataset Meta-Exploration and Documentation Tool," 2014, pp. 1-11.
Johnson, Stephen C., "Lint, a C Program Checker," Citeseer, 1977, pp. 1-12.
Kandel, Sean et al., "Research directions in data wrangling: Visualizations and transformations for usable and credible data," Information Visualization, 2011, vol. 10, No. 4, pp. 271-288.
Kandel, Sean et al., "Profiler: Integrated Statistical Analysis and Visualization for Data Quality Assessment," in Proceedings of the International Working Conference on Advanced Visual Interfaces, ACM, 2012, pp. 547-554.
Kim, Won et al., "A Taxonomy of Dirty Data," Data Mining and Knowledge Discovery, 2003, vol. 7, No. 1, pp. 81-89.
Kindlmann, Gordon et al., "Algebraic Visualization Design for Pedagogy," IEEE VIS: Workshop on Pedagogy of Data Visualization, 2016, pp. 1-5.
Kong, Ha-Kyung et al., "Frames and Slants in Titles of Visualizations on Controversial Topics," in Proceedings of the 2018 CHI Conference on Human Factors in Computing Systems, ACM, 2018, pp. 1-12.
Kong, Ha-Kyung et al., "Trust and Recall of Information across Varying Degrees of Title-Visualization Misalignment," in Proceedings of the 2019 CHI Conference on Human Factors in Computing Systems, ACM, 2019, 346, pp. 1-13.
Amperser Labs, "Proselint: A linter for prose," http://proselint.com/, Accessed: Feb. 10, 2020, pp. 1-3.
Lavigne, Sam et al., "Predicting Financial Crime: Augmenting the Predictive Policing Arsenal," arXiv preprint arXiv:1704.07826, 2017, pp. 1-8.
Ziemkiewicz, Caroline et al., "Embedding Information Visualization Within Visual Representation," in Advances in Information and Intelligent Systems, Springer, 2009, pp. 1-20.
Zhou, Zhi Quan et al., "Metamorphic Testing of Driverless Cars," Communications of the ACM, 2019, vol. 62, No. 3, pp. 61-67.
Zhao, Zheguang et al., "Controlling False Discoveries During Interactive Data Exploration," in proceedings of the 2017 International Conference on Management of Data, ACM, 2016, pp. 527-540.
Lundgard, Alan et al., "Sociotechnical Considerations for Accessible Visualization Design," IEEE Transactions on Visualization and Computer Graphics, 2019, pp. 1-5.
Lunzer, Aran et al., "It Ain't Necessarily So: Checking Charts for Robustness," IEEE VisWeek Poster Proceedings, 2014, pp. 1-3.
Lupi, Giorgia, "Data Humanism: The Revolutionary Future of Data Visualization," Print Magazine 30, 2017, pp. 1-10.
Mackinlay, Jock et al., "Show Me: Automatic Presentation for Visual Analysis," IEEE Transactions on Visualization and Computer Graphics, 2007, vol. 13, No. 6, pp. 1137-1144.
Matejka, Justin et al., "Same Stats, Different Graphs: Generating Datasets with Varied Appearance and Identical Statistics Through Simulated Annealing," in Proceedings of the 2017 CHI Conference on Human Factors in Computing Systems, ACM, 2017, pp. 1290-1294.
Mayorga, Adrian et al., "Splatterplots: Overcoming Overdraw in Scatter Plots," IEEE Transactions on Visualization and Computer Graphics, 2013, vol. 19, No. 9, pp. 1526-1538.
Mayr, Eva et al., "Trust in Information Visualization," in EuroVis Workshop on Trustworthy Visualization (TrustVis), Robert Kosara, Kai Lawonn, Lars Linsenm, and Noeska Smit (Eds.), The Eurographics Association, 2019, pp. 1-5.
Micallef, Luana et al., "Towards Perceptual Optimization of the Visual Design of Scatterplots," IEEE Transactions on Visualization and Computer Graphics, 2017, vol. 23, No. 6, pp. 1-12.
Moere, Andrew Vande, "Towards Designing Persuasive Ambient Visualization," in Issues in the Design & Evaluation of Ambient Information Systems Workshop, Citeseer, 2007, pp. 48-52.
Moritz, Dominik et al., "Formalizing Visualization Design Knowledge as Constraints: Actionable and Extensible Models in Draco," IEEE Transactions on Visualization and Computer Graphics, 2018, vol. 25, No. 1, pp. 438-448.
Newman, George E. et al., "Bar graphs depicting averages are perceptually misinterpreted: The within-the-bar bias," Psychonomic Bulletin & Review, 2012, vol. 19, No. 4, pp. 601-607.
Onuoha, Mimi, "On Missing Data Sets," https://github.com/mimionuoha/missing-datasets, Accessed: Feb. 10, 2020, pp. 1-3.
Pandey, Anshul Vikram et al., "How Deceptive are Deceptive Visualizations ?: An Empirical Analysis of Common Distortion Techniques," in Proceedings of the 33rd Annual ACM Conference on Human Factors in Computing Systems, ACM, 2015, pp. 1469-1478.
Pirolli, Peter et al., "The Sensemaking Process and Leverage Points for Analyst Technology as Identified Through Cognitive Task Analysis," in Proceedings of International Conference on Intelligence Analysis, 2005, vol. 5, pp. 1-6.
Plaisant, Catherine, "Information Visualization and the Challenge of Universal Usability," in Exploring Geovisualization, Elsevier, 2005, pp. 1-19.
Pu, Xiaoying et al., "The Garden of Forking Paths in Visualization: A Design Space for Reliable Exploratory Visual Analyics: Position Paper," in IEEE VIS: Evaluation and Beyond—Methodological Approaches for Visualization (BELIV), IEEE, 2018, pp. 37-45.
Qu, Zening et al., "Keeping Multiple Views Consistent: Constraints, Validations, and Exceptions in Visualization Authoring," IEEE Transactions on Visualization and Computer Graphics, 2017, vol. 24, No. 1, pp. 468-477.
Raman, Vijayshankar et al., "Potter's Wheel: An Interactive Data Cleaning System," in Proceedings of the 27th International Conference on Very Large Data Bases, 2001, vol. 1, pp. 381-390.
Redmond, Stephen, "Visual Cues in Estimation of Part-To-Whole Comparisons," IEEE Transactions on Visualization and Computer Graphics, 2019, pp. 1-6.
Ritchie, Jacob et al., "A Lie Reveals the Truth: Quasimodes for Task-Aligned Data Presentation," in Proceedings of the 2019 CHI Conference on human Factors in Computing Systems, ACM, 193, 2019, pp. 1-13.
Rogowitz, Bernice E. et al., "The "Which Blair Project": A Quick Visual Method for Evaluating Perceptual Color Maps," in IEEE Visualization 2001, Proceedings, 2001, pp. 183-190.
Rogowitz, Bernice E. et al., "How Not to Lie with Visualization," Computers in Physics, 1996, vol. 10, No. 3, pp. 268-273.
Rosling, Hans et al., "Health advocacy with Gapminder animated statistics," Journal of Epidemiology and Global Health, 2011, vol. 1, No. 1, pp. 11-14.
Sacha, Dominik et al., "The Role of Uncertainty, Awareness, and Trust in Visual Analytics," IEEE Transactions on Visualization and Computer Graphics, 2016, vol. 22, No. 1, pp. 240-249.
Satyanarayan, Arvind et al., "Vega-Lite: A Grammar of interactive Graphics," IEEE Transactions on Visualization and Computer Graphics, 2016, vol. 23, No. 1, pp. 341-350.
Segura, Sergio et al., "A Survey on Metamorphic Testing," IEEE Transactions on Software Engineering: 2016, vol. 42, No. 9, pp. 805-824.
Song, Hayeong et al., "Where's My Data? Evaluating Visualizations with Missing Data," IEEE Transactions on Visualization and Computer Graphics, 2018, vol. 25, No. 1, pp. 914-924.

(56) References Cited

OTHER PUBLICATIONS

Srinivasan, Arjun et al., "Augmenting Visualizations with Interactive Data Facts to Facilitate Interpretation and Communication," IEEE Transactions on Visualization and Computer Graphics, 2018, vol. 25, No. 1, pp. 672-681.
Stonebraker, Michael et al., "Data Curation at Scale: The Data Tamer System," in Proceedings of the 6th Biennial Conference on Innovative Data Systems Research, 2013, pp. 1-10.
Szafir, Danielle Albers, "The Good, the Bad, and the Biased: Five Ways Visualizations Can Mislead (and How to Fix Them)," ACM Interactions, 2018, vol. 25, No. 4, pp. 26-33.
Tableau, "Tableau Prep," https://www.tableau.com.products/prep/, 2020, pp. 1-13.
Trifacta, "Trifacta," https://www.trifacta.com/, 2020, pp. 1-8.
Trulia, "New York Real Estate Market Overview," https://www.trulia.com/real_estate/New_York-New_York/, 2020, Accessed: Feb. 11, 2020, pp. 1-3.
Valdez, André Calero et al., "A Framework for Studying Biases in Visualization Research," 2017, pp. 1-5.
Van Wijk, Jarke J., "The Value of Visualization," in VIS 05, IEEE Visualization, 2005, IEEE, pp. 79-86.
Vanderplas, Jacob et al., "Altair: Interactive Statistical Visualizations for Python," The Journal of Open Source Software, 2018, vol. 3, No. 32, pp. 1-2.
Veras, Rafael et al., "Discriminability Tests for Visualization Effectiveness and Scalability," IEEE Transactions on Visualization and Computer Graphics, 2019, pp. 1-10.
Vickers, Paul et al., "Understanding Visualization: A Formal Foundation using Category Theory and Semiotics," IEEE Transactions on Visualization and Computer Graphics, 2012, vol. 19, No. 6, pp. 1-14.
Wainer, Howard, "How to Display Data Badly," The American Statistician, 1984, vol. 38, No. 2, pp. 137-147.
Wang, Pei et al., "Uni-Detect: A Unified Approach to Automated Error Detection in Tables," in Proceedings of the 2019 International Conference on Management of Data, ACM, 2019, pp. 811-828.
Whitworth, Brian, "Polite Computing," Behaviour & Information Technology, 2005, vol. 24, No. 5, pp. 353-363.
Wood, Jo et al., "Design Exposition with Literate Visualization," IEEE Transactions on Visualization and Computer Graphics, 2018, vol. 25, No. 1, pp. 759-768.
Wu, Eugene et al., "Scorpion: Explaining Away Outliers in Aggregate Queries," Proceedings of the VLDB Endowment, 2013, vol. 6, No. 8, pp. 553-564.
Xiong, Cindy et al., "Illusion of Causality in Visualized Data," arXiv preprint arXiv:1908.00215, 2019, pp. 1-10.
Xiong, Cindy et al., "The Curse of Knowledge in Visual Data Communication," IEEE Transactions on Visualization and Computer Graphics, 2019, pp. 1-12.
Zgraggen, Emanuel et al., "Investigating the Effect of the Multiple Comparisons Problem in Visual Analysis," in Proceedings of the 2018 CHI Conference on Human Factors in Computing Systems, ACM, 2018, pp. 1-12.
International Search Report and Written Opinion for International Patent Application No. PCT/US2020/050722 mailed Nov. 24, 2020, pp. 1-6.
Arai, Taichi et al., "Preventing the creation of misleading graphs, Targeted learning tool," IPSJ SIG Technical Report, vol. 2018-GN-104, No. 4, ISSN 2188-8744, Mar. 2018, pp. 1-17.
Office Communication for U.S. Appl. No. 17/014,882 mailed Apr. 27, 2021, pp. 1-27.
Office Communication for U.S. Appl. No. 16/732,027 mailed Jun. 14, 2021, pp. 1-22.
Office Communication for U.S. Appl. No. 16/915,963 mailed Jul. 19, 2021, pp. 1-9.
Office Communication for U.S. Appl. No. 16/903,967 mailed Sep. 27, 2021, pp. 1-16.
Office Communication for U.S. Appl. No. 17/014,882 mailed Nov. 2, 2021, pp. 1-33.
International Search Report and Written Opinion for International Patent Application No. PCT/US2021/043167 mailed Oct. 26, 2021, pp. 1-7.
International Search Report and Written Opinion for International Patent Application No. PCT/US2021/043177 mailed Oct. 26, 2021, pp. 1-8.
Office Communication for U.S. Appl. No. 16/732,027 mailed Nov. 15, 2021, pp. 1-25.
International Search Report and Written Opinion for International Patent Application No. PCT/US2021/049229 mailed Nov. 16, 2021, pp. 1-8.
Office Communication for U.S. Appl. No. 16/944,064 mailed Nov. 26, 2021, pp. 1-50.
Office Communication for U.S. Appl. No. 16/672,130 mailed Jan. 5, 2022, pp. 1-32.
Office Communication for U.S. Appl. No. 16/915,963 mailed Jan. 7, 2022, pp. 1-9.
Office Communication for U.S. Appl. No. 17/014,882 mailed Jan. 25, 2022, pp. 1-6.
Wu, Aoyu et al., "MultiVision: Designing Analytical Dashboards with Deep Learning Based Recommendation," IEEE, arXiv preprint, arXiv:2107.07823, Jul. 2021, pp. 1-11.
Shi, Danqing et al., "Talk2Data: High-Level Question Decomposition for Data-Oriented Question and Answering," arXiv preprint, arXiv:2107.14420, Jul. 2021, pp. 1-11.
Wang, Yun et al., "DataShot: Automatic Generation of Fact Sheets from Tabular Data," IEEE Transactions on Visualization and Computer Graphics, vol. 26, No. 1, Aug. 2019, pp. 1-11.
Wang Baldonado, Michelle Q. et al., "Guidelines for Using Multiple Views in Information Visualization," AVI '00, in Proceedings of the Working Conference on Advanced Visual Interfaces, May 2000, pp. 1-10.
Chen, Xi et al., "Composition and Configuration Patterns in Multiple-View Visualizations," arXiv preprint, arXiv:2007.15407, Aug. 2020, pp. 1-11.
Crisan, Anamaria et al., "GEVITRec: Data Reconnaissance Through Recommendation Using a Domain-Specific Visualization Prevalence Design Space," IEEE Transactions on Visualization and Computer Graphics, TVCG Submission, Jul. 2021, pp. 1-18.

* cited by examiner

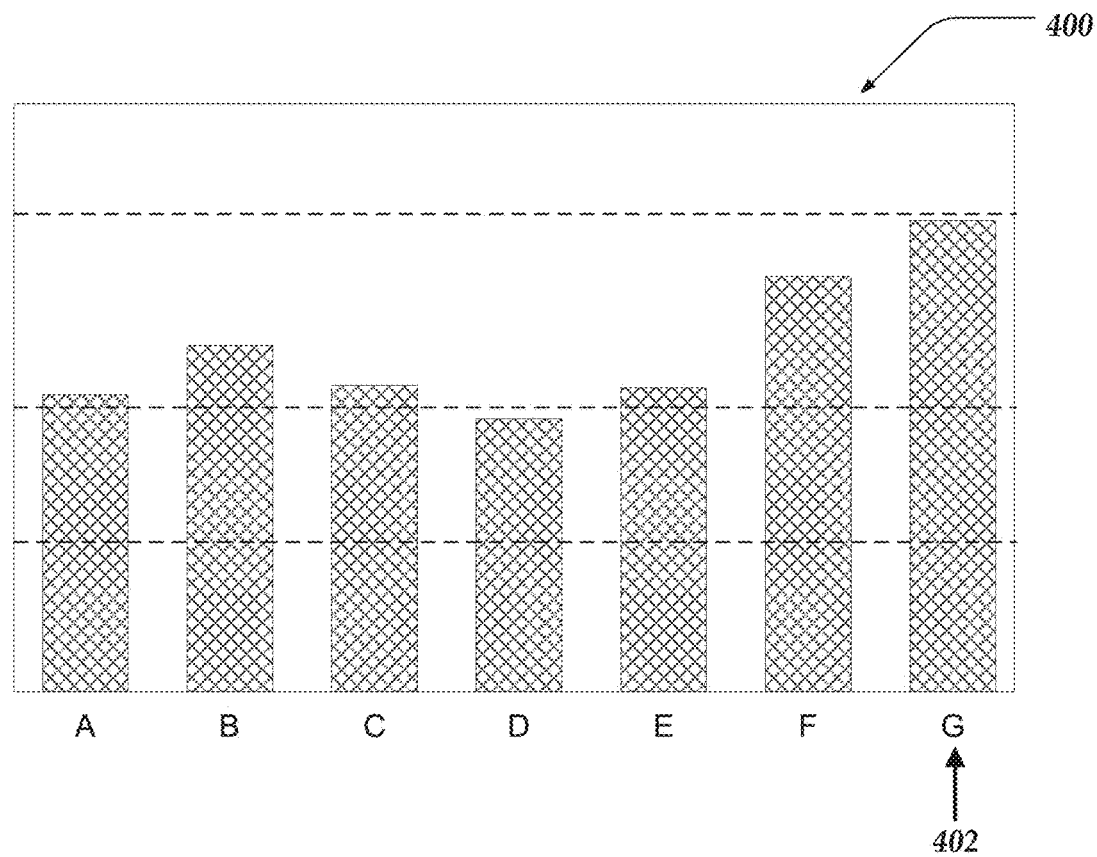
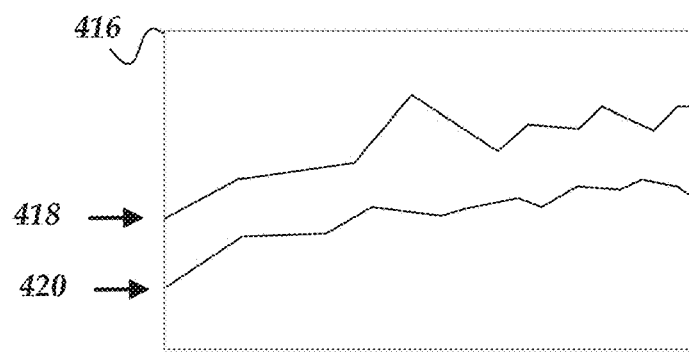
Fig. 4

DETECTING ANOMALIES IN VISUALIZATIONS

CROSS-REFERENCE TO RELATED APPLICATION

This application is a Utility Patent application based on previously filed U.S. Provisional Patent Application No. 63/277,563 filed on Nov. 9, 2021, the benefit of the filing date of which is hereby claimed under 35 U.S.C. § 119(e) and which is further incorporated in entirety by reference.

TECHNICAL FIELD

The present invention relates generally to data analysis, and more particularly, but not exclusively to, determining anomalies in visualizations.

BACKGROUND

The amount of data that organizations manage is rapidly growing. In self-service analytics environments, often analytical content built on this data grows at a correspondingly rapid pace. To keep on top of all the meaningful changes in their data, often users need to frequently visit all their relevant content to understand the historical context of their important data points. However, organizations often have far more data than users can be expected to reasonably analyze. Often users can consume only a portion of the available content created for them, and anomalies that may be hidden outside of this portion of content may be difficult to surface. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 4 illustrates a logical representation of a portion of a visualization in accordance with one or more of the various embodiments;

DETAILED DESCRIPTION OF VARIOUS EMBODIMENTS

Figure 1:
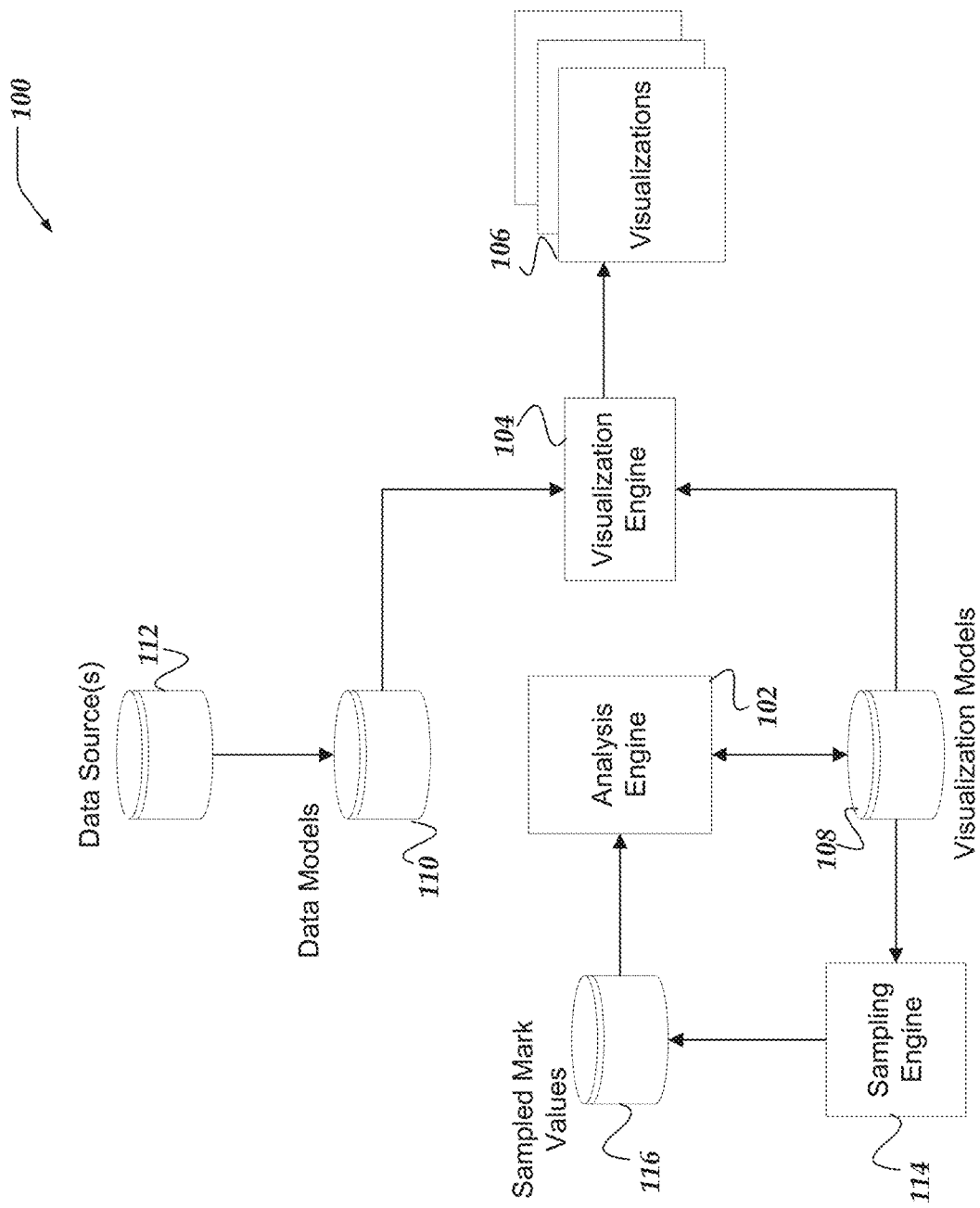
FIG. 1 illustrates a logical architecture of a system for detecting anomalies in visualizations in accordance with one or more of the various embodiments.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "data source" refers to the source of the underlying information that is being modeled or otherwise analyzed. Data sources may include information from or provided by databases (e.g., relational, graph-based, no-sql, or the like), file systems, unstructured data, streams, or the like. Data sources are typically arranged to model, record, or memorialize various operations or activities associated with an organization. In some cases, data sources are arranged to provide or facilitate various data-focused actions, such as, efficient storage, queries, indexing, data exchange, search, updates, or the like. Generally, a data source may be arranged to provide features related to data manipulation or data management rather than providing an easy to understand presentation or visualization of the data.

As used herein the term "data model" refers to one or more data structures that provide a representation of an underlying data source. In some cases, data models may provide views of a data source for particular applications. Data models may be considered views or interfaces to the underlying data source. In some cases, data models may map directly to a data source (e.g., practically a logical pass through). Also, in some cases, data models may be provided by a data source. In some circumstances, data models may be considered interfaces to data sources. Data models enable organizations to organize or present information from data sources in ways that may be more convenient, more meaningful (e.g., easier to reason about), safer, or the like.

As used herein the term "data object" refers to one or more entities or data structures that comprise data models. In some cases, data objects may be considered portions of the data model. Data objects may represent individual instances of items or classes or kinds of items.

As used herein the term "visualization model" refers to one or more data structures that visualization engines may employ to generate visualizations for display on one or more hardware displays. Visualization models may define various features or objects that visualization engines may render into a displayed visualization including styling or user interface features that may be made available to non-authoring users.

As used herein, the term "metric" refers to various quantifiable or measurable values derived from a visualization or associated with a visualization. In some cases, the type of metrics that are available may depend on the visualization being analyzed or monitored.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing visualizations of data. In one or more of the various embodiments, a plurality of visualizations based on data from one or more data sources may be provided such that each visualization includes one or more marks that may be associated with one or more values from the one or more data sources.

In one or more of the various embodiments, one or more monitored visualizations from the plurality of visualizations may be determined based on one or more metrics associated with the one or more monitored visualizations.

In one or more of the various embodiments, one or more mark values may be sampled from each monitored visualization such that the one or more sampled mark values may be stored with a timestamp that corresponds to a time of that the one or more mark values are sampled.

In one or more of the various embodiments, in response to an amount of the one or more sampled mark values for a monitored visualization being greater than a threshold value further actions may be performed including: training one or more mark models to classify a portion of the one or more sampled mark values associated with the monitored visualization such that the one or more mark models may predict one or more ranges of values for the one or more classified mark values associated with the monitored visualization; and in response to the portion of the one or more classified mark values associated with the monitored visualization having a value that may be outside of the one or more predicted range values, indicating that the monitored visualization may be associated with an anomalous mark value such that the indication may be reported to one or more users.

In one or more of the various embodiments, activity associated with the plurality of visualizations may be monitored such that the monitored activity may be one or more of a frequency of access, a number of times a visualization is favorited, a number of users that register to follow a visualization, a number of times a visualization is included in a dashboard, or the like. And, in one or more of the various embodiments, determining one or more values for the one or more metrics based on the monitored activity.

In one or more of the various embodiments, a portion of the plurality of visualizations may be excluded from the one or more monitored visualizations based on one or more characteristics of the excluded portion of visualizations such that the one or more characteristics may include one or more of a number of marks in the excluded visualizations, a license associated with the excluded visualizations, a user preference, a data type included in the excluded visualizations, a visualization type of the excluded visualizations, or the like.

In one or more of the various embodiments, the one or more mark models may be generated based on Gradient-Boosted Decision Tree models that are set to fit an upper bound and a lower bound separately using quantile regression such that the information corresponding to the one or more sampled mark values may be represented as a feature vector, and such that the feature vectors may include one or more of a mark value, a change from a previous value, date information, or the like.

In one or more of the various embodiments, training the one or more mark models to classify the portion of the one or more sampled mark values associated with the monitored visualization may include training one or more different mark models for the monitored visualization such that each different mark model may be directed to classifying one or more different types of anomalies for the monitored visualization.

In one or more of the various embodiments, predicting the one or more ranges of values for the one or more classified mark values associated with the monitored visualization may include discarding the one or more trained mark models.

In one or more of the various embodiments, sampling the one or more mark values from each monitored visualization may include storing the one or more sampled mark values in another data source that may be separate the from the one or more data sources.

Illustrative Logical System Architecture

FIG. 1 illustrates a logical architecture of system 100 for detecting anomalies in visualizations in accordance with one or more of the various embodiments. In one or more of the various embodiments, system 100 may be a visualization platform arranged to include various components including, analysis engine 102, visualization engine 104, visualizations 106 visualization models 108, data models 110, data sources 112, sampling engine 114, sample mark values 116, or the like.

In one or more of the various embodiments, data sources 112 represent a source of raw data, records, data items, or the like, that provide the underlying data may be employed for generating visualizations.

In one or more of the various embodiments, data models, such as, data models 110 may be data structures, or the like, that provide one or more logical representations of the information stored in one or more data sources, such as, data source 112. In some embodiments, data models may include data objects that correspond to one or more portions of tables, views, or files in data sources. For example, in some embodiments, if data source 112 is a CSV file or a database, a data model, such as, data model 112 may be comprised of one or more data objects that may correspond to record fields in data source 112. Likewise, in some embodiments, data models may include fields that correspond to fields or attributes in data sources. For example, in some embodiments, if data source 112 is a Relational Database System (RDBMS), a data model included in data models 110A may be comprised of one or more data model fields that correspond to one or more columns or one or more tables included in data sources 112.

In some embodiments, a visualization engine, such as, visualization engine 104 may be employed to transform or map some or all of data sources 112 into data models 110. In some embodiments, visualization engines may be arranged to employ or execute computer readable instructions provided by configuration information to determine some or all of the steps for transforming values in data sources into data models.

In one or more of the various embodiments, visualization engines, such as, visualization engine 104 may be arranged to employ visualization models, such as, visualization models 108 to determine the layout, styling, interactivity, or the like, for visualizations, such as, visualizations 106 that may be displayed to users. Also, in some embodiments, visualization engines may be arranged to employ data item values provided via data sources 112 to populate visualizations with values based on a source data model.

In one or more of the various embodiments, visualization models may be defined using one or more visualization specifications. In some embodiments, visualization specifications may include computer readable instructions, such as, formal or semi-formal rules that may correspond to visualization models. In some embodiments, visualization specifications may be used to represent or define one or more visualization models. In some embodiments, visualization specifications may be employed to generate visualization models or visualizations.

In some embodiments, dashboard user interfaces that include a collection of visualizations may be a common form of visual analytics that may often be employed in business intelligence applications, informatics, or industrial monitoring as well as many other domains or analytical tasks. In some embodiments, these visual displays may take many forms and styles based on the data acquired and the information needs of the viewer or analyst. In some cases, due to this variety, there may be a lack of consistent, agreed-to definitions for what constitutes a quality dashboard visualization. Accordingly, it may be conventional to adopt a broad view of what can be considered a dashboard including infographics, narrative elements, or the like. Herein, for some embodiments, dashboard user interfaces may be user interfaces arranged to at least include a visual display of important information that may be needed to achieve one or more objectives; consolidated and arranged on a single screen so the information can be monitored at a glance.

In some cases, dashboards may be designed to display the current status or KPIs of interest to a user or organization. In some cases, data sources or dashboards may be designed to show historical data, where the history of the changes may be apparent in how the data is stored or visualized. However, it may be often the case that the historical information is not represented anywhere. In this case, the history of the data needs to be captured and stored separately, something that may often require additional IT resources that may make reporting or visualization such information disadvantageous.

In some embodiments, sampling engines, such sampling engine 114 may be arranged to automatically determine one or more mark values from monitored visualizations. In some embodiments, metric engines may be arranged to periodically sample values of the one or more marks and store them in a data store, such as, sampled mark values 116.

Further, in some embodiments, analysis engines may be arranged to generate one or more models to identify anomalous mark values in the monitored visualizations.

In one or more of the various embodiments, if one or more anomalies may be detected, analysis engines may be arranged to generate one or more notifications, alerts, events, reports, or the like. In some embodiments, notifications, or the like, may be provided to external services or systems that may manage the investigation the reported anomalies.

In one or more of the various embodiments, anomalies may be detected based on the individual marks based on snapshots of mark information from monitored visualizations. In some cases, for some embodiments, various criteria may be evaluated to determine the mark information that may be sampled. In some cases, for some embodiments, the criteria may include: marks where time is not already part of the visualization; only on extract data; only on visualizations that have less than a configurable number of marks (E.g., 10,000 or less.)

In some embodiments, anomaly detection for a given visualization or dashboard may be delayed until the number of sampled snapshots of a mark is above a configurable threshold value, such as, fifty.

In one or more of the various embodiments, sampling engines may be arranged to employ various configurable criteria to determine the visualizations or dashboards that may be sampled. In some cases, this may include the number of times a user has "favorited" a visualization or dashboard, the number of times users have viewed visualizations or dashboards, or the like.

In one or more of the various embodiments, sampling engines may be arranged to employ a datastore that may be separate for data sources, or the like, for storing sampled mark information.

In one or more of the various embodiments, sampling engines may be arranged to limit data collection to visualized data. Accordingly, in some embodiments, sampled mark information may be based on visualized data that may be curated to show the measures that may be useful in analysis so in effect the analysis may identify which columns to watch rather than watch all columns. Further, sampling from visualizations may provide readily available and proven sources of metadata at the view level that infers what may be relevant to a user, such as, view counts, favorites, subscriptions, or the like. Also, in some embodiments, sampling marks in visualizations may reduce the scale or scope of sampled data as compared to generating snapshots of all the data in data sources which may require monitoring all data in all data sources.

In one or more of the various embodiments, sampling engines may be arranged to maintain a list of actively monitored visualizations or dashboards. In some embodiments, sampling engines may be arranged to periodically (e.g., hourly, daily, nightly, or the like) re-evaluate the list. In some embodiments, the criteria used to determine the visualizations or dashboards that may be monitored include a variety of criteria: the list of views may be capped at a maximum size; controlled by the server administrator; such that resource usage may be controlled; if there may be multiple visualization platform instances, particularly in online/web-based embodiments, each may be allocated a particular number of visualizations to be monitored. In some embodiments, the number of monitored visualizations may be proportional to the number of licensed users associated with the instances or instance locations. In one or more of the various embodiments, the determination of monitored dashboards may be optimized such that the most useful visualizations or dashboards may be monitored. In some embodiments, the determination of monitored visualizations may be based on metrics associated with visualizations that have been favorited, subscribed, and general popularity of the visualizations.

In some embodiments, if sufficient samples (over time) have been collected, analysis engines may be arranged to attempt anomaly detection on newly sampled mark values.

In one or more of the various embodiments, this may include automatically training a model on the sampled mark information data for each mark. In some embodiments, the mark models may be fit to predict a 99% confidence interval, meaning mark models may find an upper bound prediction which may be expected to be higher than 99.5% of the data and a lower bound that may be expected to be lower than 99.5% of the data. In some cases, the confidence interval range may be based on configuration information to account for local requirements or local circumstances.

In some embodiments, if the models may be fitted to sampled data for a mark, analysis engines may be arranged to perform an inference step based on comparing the latest mark value to the confidence interval. Accordingly, in some embodiments, mark values determined to be above the upper bound or below the lower bound may be considered an anomaly.

In one or more of the various embodiments, analysis engines may be arranged to generate mark models based on Gradient-Boosted Decision Tree models that are set to fit the upper and lower bounds separately using Quantile Regression. In some embodiments, mark data may be represented as a feature vector of the value, the change from the previous value(s), date information (quarter, month, day of week), along with one or more configurable trend- and cycle-fitting features.

In one or more of the various embodiments, models may be generated on-the-fly or on-demand and then discarded after evaluating mark information.

In one or more of the various embodiments, analysis engines may be arranged to generate or modify one or more user interfaces to represent detected anomalies. In some embodiments, information about anomalies may be displayed alongside the visualizations or dashboards. Also, in some embodiments, analysis engines may be arranged to send notification, reports, email digests, or the like, the include information about one or more detected anomalies.

Figure 2:
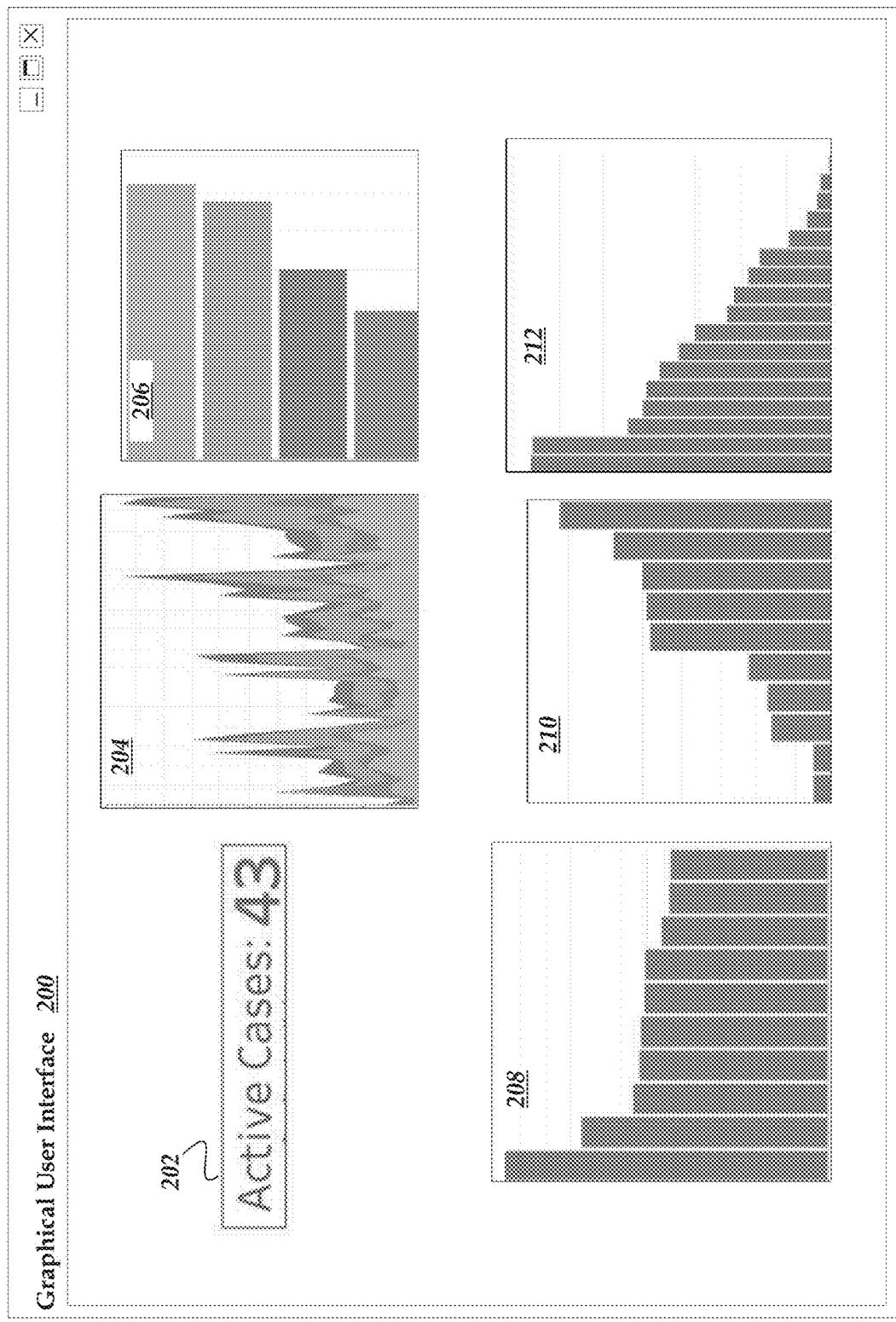
FIG. 2 illustrates a portion of a user interface that may be considered a dashboard in accordance with one or more of the various embodiments.

FIG. 2 illustrates a portion of user interface 200 that may be considered a dashboard in accordance with one or more of the various embodiments. In this example, user interface 200 includes several different visualizations that comprise a dashboard, including, visualization 202, visualization 204, visualization 206, visualization 208, visualization 210, visualization 212, or the like. These visualizations may be considered to represent visualizations of various KPIs, statuses, or the like. In some cases, visualizations included in a dashboard, such as, dashboard 200 may include one or more visualizations.

In one or more of the various embodiments, user interface 200 may be displayed on one or more hardware displays, such as, client computer displays, mobile device displays, or the like. In some embodiments, user interface 200 may be provided via a native application or as a web application hosted in a web browser or other similar applications. One of ordinary skill in the art will appreciate that for at least clarity or brevity many details common to commercial/production user interfaces have been omitted from user interface 200. Likewise, in some embodiments, user interfaces may be arranged differently than shown depending on local circumstances or local requirements, such as, display type, display resolution, user preferences, or the like. However, one of ordinary skill in the art will appreciate that the disclosure/description of user interface 200 is at least sufficient for disclosing the innovations included herein.

Figure 3:
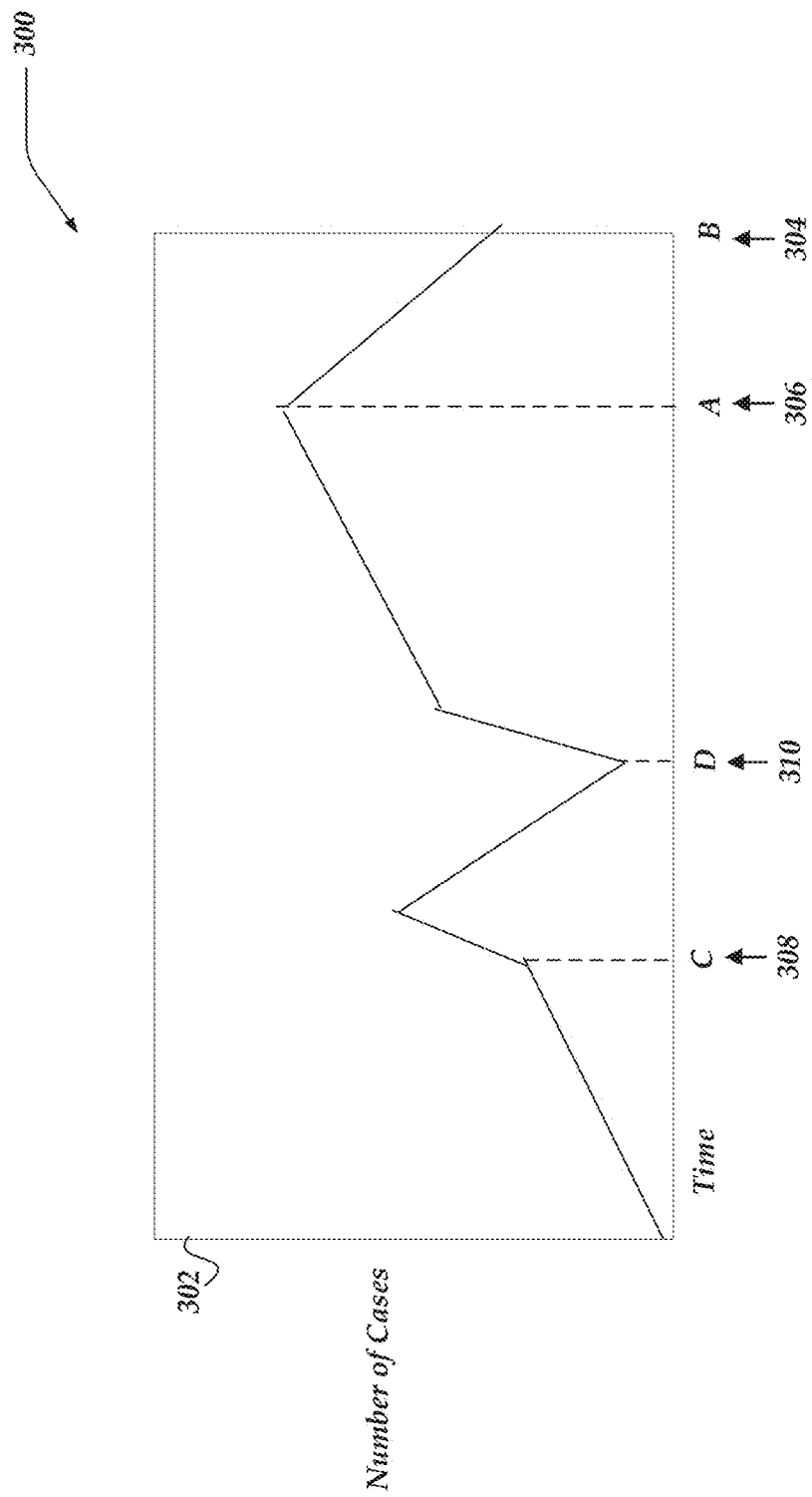
FIG. 3 illustrates a logical representation of a portion of a mark visualization for detecting anomalies in visualizations in accordance with one or more of the various embodiments.

FIG. 3 illustrates a logical representation of a portion of user interface 300 of a visualization that illustrates sampled mark values that may be used for detecting anomalies in visualizations in accordance with one or more of the various embodiments. As described above, in some embodiments, metric engines may be arranged to monitor or record metrics associated with visualizations. Accordingly, in some embodiments, analysis engines may be arranged to generate mark visualizations, such as, mark visualization 302 to display historical information about one or more marks for one or more of the visualizations.

In this example, mark visualization 302 may be considered to be based on visualization 202 shown in FIG. 2. In this example, for some embodiments, mark visualization 302 may be a line plot that represents the number of cases (from visualization 202 in FIG. 2) over time. In this example, the current view of visualization 202 showing a value of 43 cases is represented by point 304 ('B'). Accordingly, the visualization 202 in user interface 200 is showing the current number of cases, but it does not provide context or trend information that may be of interest to users. In this example, point 306 ('A') represents an earlier time when the number of cases is more than the current value. In this example, if the user viewed the dashboard (user interface 200) at point (in time) 308 ('C') and then at point (in time) 304 ('B'), a user may have the impression that the values for visualization 202 have been flat and smooth even the actual value represented by visualization 202 is fluctuating wildly.

Also, in one or more of the various embodiments, analysis engines may be arranged to monitor marks in one or more visualizations to identify one or more anomalies based on the mark values. In this example, point 310 ('D') represents a low value that may be considered an anomaly. Accordingly, in this example, the analysis engine may generate one or more models that may determine the anomalous mark values even if the user is not viewing the dashboard. As described above, analysis engines may be arranged to generate one or more notifications, events, alerts, or the like, if anomalies may be detected.

FIG. 4 illustrates a logical representation of a portion of visualization 400 in accordance with one or more of the various embodiments. As described above, visualization engines may be arranged to employ visualization models and data models to generate visualizations, such as, visualization 400. In this example, visualization 400 may be considered to represent a bar chart that showing monthly revenue for different products, different business units, or the like. One of ordinary skill in the art will appreciate that visualization models or visualization engines may be arranged to generate many different types of visualizations for various purposes depending on the design goals of visualization authors, users or organizations. Here, visualization 400 is presented as a non-limiting example to help provide clarity to the description of these innovations. One of ordinary skill in the art will appreciate that this example is at least sufficient to disclose the innovations herein and that visualization engines or visualization models may be arranged to generate many different visualizations for many different purposes in many subject matter domains.

In this example, visualization 400 may be considered a visualization that may be designated for anomaly monitoring. Accordingly, in some embodiments, analysis engines may be arranged to sample mark information from visualization 400 for detecting anomalies in visualizations. In some embodiments, analysis engines may be arranged to sample some or all marks in visualizations that have been determined for anomaly monitoring.

Accordingly, in some embodiments, analysis engines may be arranged to determine visualizations for monitoring based on various criteria, including, popularity of a visualization, the number times a visualization may be bookmarked by users, or the like. Also, in some embodiments, analysis engines may be arranged to provide user interfaces that enable users to select one or more visualizations to monitor.

In one or more of the various embodiments, analysis engines may be arranged to periodically sample mark values of monitored visualizations. Accordingly, in some embodiments, analysis engines may be arranged to store the sampled mark values in a data store. In some embodiments, the sampled mark information may be stored in a data store that may be separate from the one or more data sources that supply data for the monitored visualizations.

In this example, for some embodiments, table 404 represent a portion of a data store that may be employed for storing sample mark values. In some embodiments, values for each mark may be stored in separate table or data stores. Likewise, in some embodiments, values for more than one mark may be stored in the same table. In this example, mark information for each mark in monitored visualization 400 may be considered to be stored in as columns in table 404.

Accordingly, in this example: column 406 represents timestamp information that may be considered to correspond when the mark value may be sampled; column 408 and column 410 may be considered columns for storing sampled mark values. Further, in some embodiments, analysis engines may be arranged to store additional information associated with the monitored visualizations or the associated marks. For example, in some embodiments, analysis engines may include codes, tags, or flags, that may indicate if a mark is removed or otherwise unavailable.

In one or more of the various embodiments, analysis engines may be arranged to generate mark models that are fit to the sampled marks of the monitor visualizations. In some embodiments, mark models may be arranged to predict band of values with high values and low values such that if a sampled mark value falls outside the band, it may be considered to be anomalous.

In one or more of the various embodiments, analysis engines may be arranged to generate and train mark models on-the-fly for each monitored visualization. Accordingly, in some embodiments, if enough mark information has been collected for a monitored visualization, analysis engines may be arranged to generate and train a mark model for that visualization.

In some embodiments, analysis engines may be arranged to fit mark models to the sampled mark values of monitored visualizations. Accordingly, in some embodiments, analysis engines may be configured to defer mark model generation until a sufficient number of sampled mark values have been collected. In some embodiments, the number of sampled mark values deemed sufficient may vary depending on one or more characteristics of the marks, mark models, or the monitored visualizations. Likewise, in some embodiments, analysis engines may enable users to modify the number of mark samples deemed sufficient for modeling. For example, in some cases, a user may demand increased model accuracy which may require more sampled values that in other cases.

In this example, mark model 416 is graphical representation of a mark model with line 418 that predicts an upper bound for marks in a monitored visualization and line 420 that predicts a lower bound for the marks in the monitored visualization.

Thus, in some embodiments, if the latest value of a mark, such as, mark 402, may be outside of the range predicted by the mark model, analysis engines may be arranged to consider the mark value anomalous.

In one or more of the various embodiments, analysis engines may be arranged to discard mark models if the monitored visualization has been evaluated. Accordingly, in some embodiments, resources used for the mark models (e.g., memory) may be released.

In one or more of the various embodiments, one or more visualizations or marks may be excluded from analysis depending on one or more characteristics, such as, data type of marks, size of visualization (e.g., number of marks), owner/user of visualization (e.g., licensing considerations), type of visualization, or the like. In some embodiments, mark models may be unavailable for particular data types or visualization types. Or, in some embodiments, the mark models available for a particular visualization type or mark type may be limited to providing results that may be unsuitable for a given application. For example, the available mark models may not provide predictions that are precise enough for a particular application.

Further, in some embodiments, analysis engines may be configured to balance or distribute analysis resources across multiple organizations, locations, users, or the like. Accordingly, in some embodiments, analysis engines may be enabled to prevent one or more organizations, users, or the like, from starving others of computing resources for analysis.

Generalized Operations

FIGS. 5-8 represents generalized operations for detecting anomalies in visualizations in accordance with one or more of the various embodiments. In one or more of the various embodiments, processes 500, 600, 700, and 800 described in conjunction with FIGS. 5-8 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 5-8 may be used for detecting anomalies in visualizations in accordance with at least one of the various embodiments or architectures such as those described in conjunction with FIGS. 1-4. Further, in one or more of the various embodiments, some or all of the actions performed by processes 500, 600, 700, and 800 may be executed in part by visualization engine 1122, analysis engine 1124, sampling engine 1126, or the like, running on one or more processors of one or more network computers.

Figure 5:
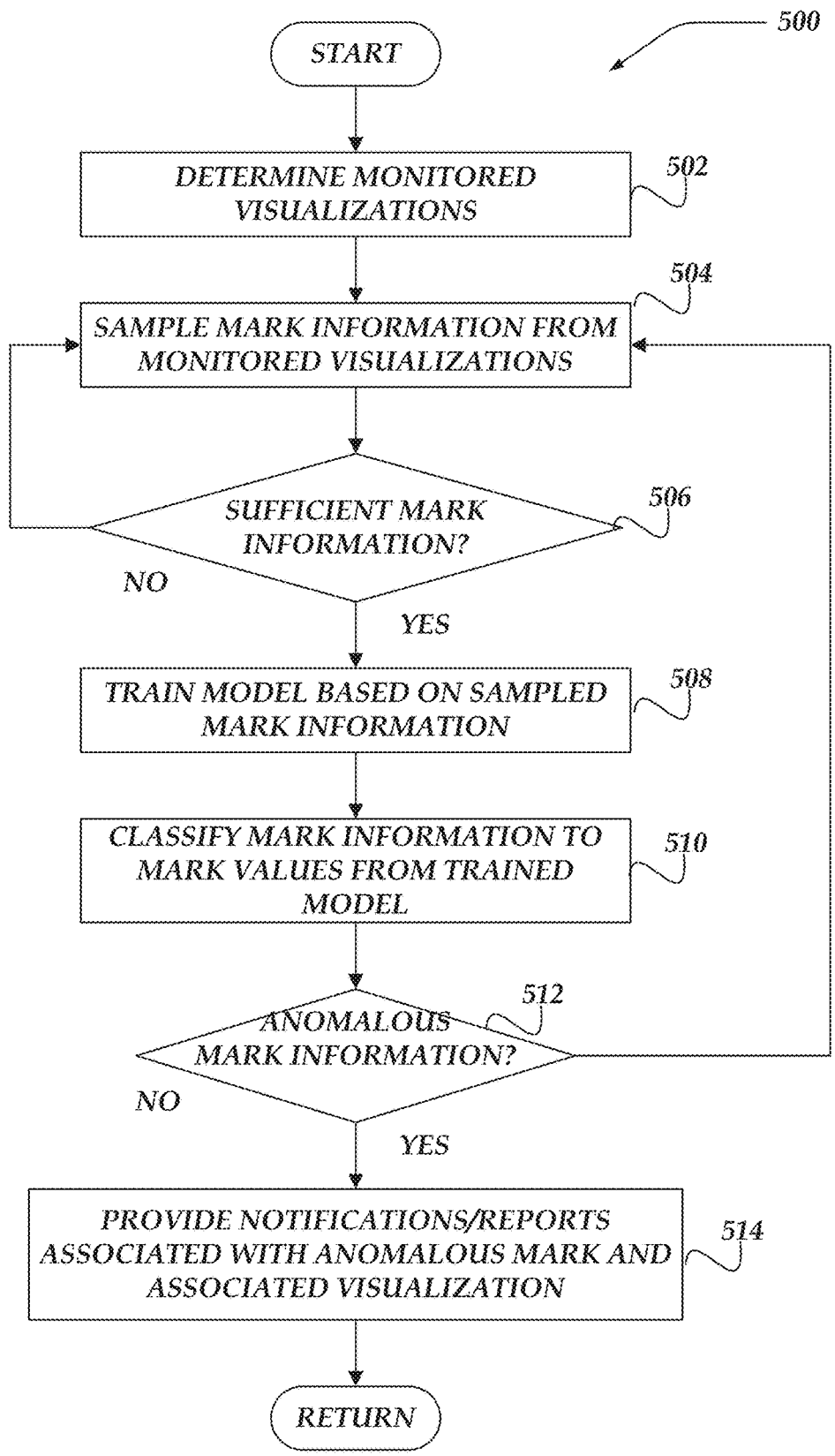
FIG. 5 illustrates an overview flowchart of a process for detecting anomalies in monitored dashboard data in accordance with one or more of the various embodiments.

FIG. 5 illustrates an overview flowchart of process 500 for detecting anomalies in monitored dashboard data in accordance with one or more of the various embodiments. After a start block, at block 502, in one or more of the various embodiments, one or more visualizations or dashboards may be determined for monitoring. In one or more of the various embodiments, users may be enabled select dashboards or other visualizations for providing and surfacing metrics. In some embodiments, analysis engines may be arranged to automatically determine one or more visualizations or dashboards based on various criteria, including user affinity, user preferences, the amount of user activity associated with visualizations, or the like. Accordingly, in some embodiments, users or organizations may be enabled to set filters, preferences, or the like, that may determine if a visualizations or dashboards may be processed for detecting and recommending temporal anomalies in monitored dashboard data.

At block 504, in one or more of the various embodiments, sampling engines may be arranged to automatically collect mark information for the one or more monitored visualizations.

In some embodiments, the sampling engines may be arranged to sample mark values from the visualization or the visualization model directly. Accordingly, in some embodiments, the analysis engines may ensure that the sampled mark values match the values that may be displayed in the visualization.

At decision block 506, in one or more of the various embodiments, if sufficient mark information has been collected, control may flow to block 508; otherwise, control may loop back to block 504.

At block 508, in one or more of the various embodiments, analysis engines may be arranged to train one or more mark models based on the sample mark information. In one or more of the various embodiments, mark models may be fit such that there may be an upper range and a lower range that represent a predicted range of values for each mark in the visualization.

At block 510, in one or more of the various embodiments, analysis engines may be arranged to classify the most recent sampled mark information, in some embodiments, analysis engines may be arranged to classify the mark values based on predictions provided by the trained models. In some embodiments, mark models may be arranged to predict a range of values for a given mark. Thus, in some embodiments, analysis engines may be arranged to test if the mark values of a monitored visualization fall within the ranges of values predicted by its corresponding mark model.

At decision block 512, in one or more of the various embodiments, if the anomalous mark information may be determined, control may flow to block 514; otherwise, control may loop back to block 504. In some embodiments, if one or more mark values in a monitored visualization may be outside of the range predicted by a corresponding mark model, the mark or the visualization may be considered to be anomalous.

At block 514, in one or more of the various embodiments, analysis engines may be arranged to provide one or more notifications or reports associated with the one or more of the anomalous marks, the associated visualization, the associated dashboards.

In one or more of the various embodiments, notifications may include sending text messages, emails, other messages via other messaging applications, audio alerts, or the like. In some embodiments, metric engines may be arranged to register the notification with the visualization engine such that alert information associated with the anomaly may be displayed on a user interface. In some cases, for some embodiments, a visual alert may be displayed on the dashboard user interface that includes the visualization or another visualization generated to represent the metric or the mark value(s) that may be associated with the anomaly. In some embodiments, the notification may include generating a log entry that may be reviewed later.

In one or more of the various embodiments, the contents of the notification may vary depending on the type of anomaly, the metric, the visualization, the dashboard, or the like. Accordingly, in some embodiments, metric engines may be arranged to determine notification rules or notification formats based on configuration information to account for local circumstances or local requirements.

Next, in one or more of the various embodiments, control may be returned to a calling process.

Figure 6:
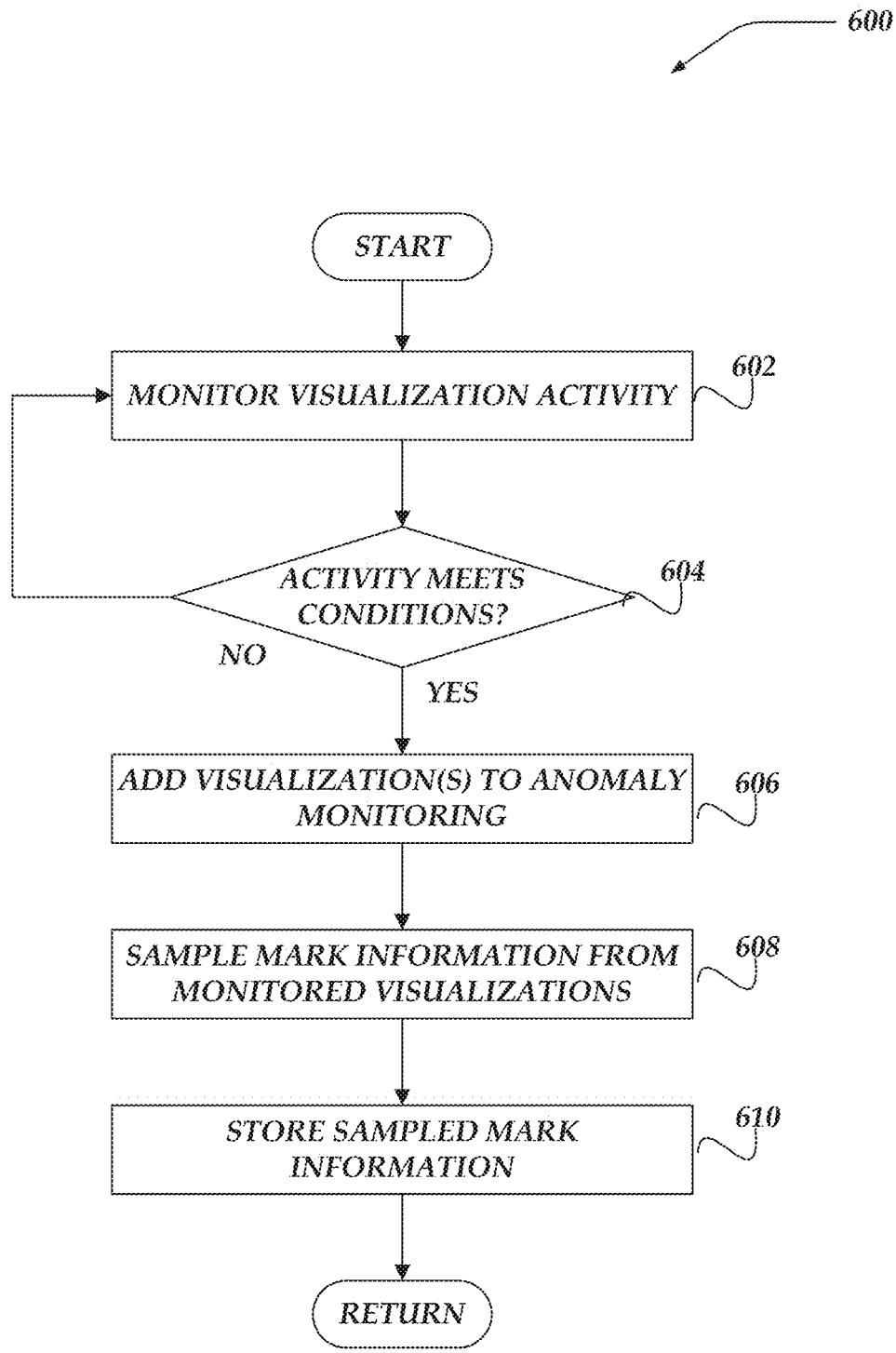
FIG. 6 illustrates a flowchart of a process for detecting anomalies in visualizations in accordance with one or more of the various embodiments.

FIG. 6 illustrates a flowchart of process 600 for detecting anomalies in visualizations in accordance with one or more of the various embodiments. After a start block, at block 602, in one or more of the various embodiments, analysis engines may be arranged to monitored activity associated with one or more visualizations provided by the visualization platform. In one or more of the various embodiments, visualization platforms may include many hundreds or thousands of visualizations, including many collections of visualizations in workbooks or dashboards.

In some embodiments, visualization platforms may be arranged to collect one or more metrics for visualizations or visualization collections (e.g., workbooks or dashboards). In some embodiments, analysis engines may be arranged to collect one or more metrics such as frequency of access, number of times a visualization or visualization collection is favorited, number of users that register to follow a visualization or visualization collection, number of times a visualization or visualization collection is included in other collections.

At decision block 604, in one or more of the various embodiments, if the activity associated with one or more visualizations meet one or more declared conditions, control may flow to block 606; otherwise, control may loop back to block 602. In one or more of the various embodiments, analysis engines may be configured declare one or more threshold values for the one or more metrics. Accordingly, in some embodiments, if a metric for a visualization or visualization collection exceeds a relevant metric, those visualizations may be considered eligible for detecting anomalies in visualizations.

In one or more of the various embodiments, analysis engines may be arranged to limit the visualization eligible for anomaly detection to reduce the amount of resources required to collect mark information and perform subsequent anomaly analysis. Accordingly, in some embodiments, the specific metrics or threshold values may vary depending on the amount of computing/storage resources that may be made available to analysis engines. In some embodiments, analysis engines may be arranged to enable users or administrators to activate one or more condition or metric threshold for determining if a visualization should be monitored for detecting anomalies. Accordingly, in some embodiments, analysis engines may be arranged to employ rules, instructions, or the like, provided via configuration information to determine the particular metrics, threshold values, other conditions, or the like, for determining if a visualization or visualization collection may be determined eligible for monitoring of anomalies.

Further, in some embodiments, there may be other criteria for enabling anomaly detection for a visualization that may be considered, including number of marks in the visualization, type of visualization, data types of marks in the visualization, or the like. For example, in some embodiments, mark models may be unavailable for particular mark data types or visualization types. Accordingly, in some embodiments, such visualizations may be automatically excluded from anomaly detection. Note, in some embodiments, additional mark models may be introduced or developed to enable visualizations once disqualified from anomaly detection to be eligible for anomaly detection. Accordingly, in some embodiments, analysis engines may be arranged to determine visualization eligibility criteria based on configuration information.

At block 606, in one or more of the various embodiments, analysis engines may be arranged to add the one or more visualizations that met the activity condition a monitoring set. In one or more of the various embodiments, analysis engines may be arranged to automatically maintain list of visualizations that should be monitored for anomalies. In some embodiments, analysis engines may be arranged to provide user interfaces that enable one or more users or one or more administrators to remove visualization or visualization collections from the anomaly monitoring list. Likewise, in some embodiments, analysis engines may be arranged to enable one or more users or one or more administrators to manually select one or more visualization or visualization collections to add to the anomaly monitoring list.

In one or more of the various embodiments, analysis engines may be arranged to have a limit to the number of visualizations that may be included in the anomaly monitoring list. Accordingly, in some embodiments, analysis engines may be arranged to score visualizations based on the metrics or conditions and place them in the list in rank order based on their scores. Thus, in some cases, for some embodiments, one or more visualization may be omitted or removed from an anomaly monitoring list based on their own metrics and the metrics of the other visualization included in the visualization platform.

At block 608, in one or more of the various embodiments, analysis engines may be arranged to sample mark information from the one or more monitored visualizations.

In one or more of the various embodiments, analysis engines may be arranged to periodically collect the current mark values or other mark information for the visualizations that may be included in the anomaly monitoring list.

As described above, analysis engines may be arranged to collect mark information for monitored visualization. In some embodiments, in some cases, the mark information may vary depending on the type of visualization or applicable mark models. Accordingly, in some embodiments, analysis engine may be arranged to employ configuration information to determine the particular mark information that may be collected for a particular visualization to account for local requirements or local circumstances.

At block 610, in one or more of the various embodiments, analysis engines may be arranged to store the sampled mark information in a data store. In one or more of the various embodiments, analysis engines may be arranged to employ a dedicate data store for storing sampled mark information. Accordingly, in some embodiments, sampled mark information may be kept separate from the underlying data sources used for the monitored visualizations.

Accordingly, in some embodiments, other data stores used for storing visualizations, visualization collections, visualization data, user data, or the like, may be insulated from performance loads associated with sampling, storing, or analyzing sampled mark information.

Also, in some embodiments, in some cases, analysis engines may store the sampled mark information in the same data store used by the rest of the visualization platform. Accordingly, in some embodiments, smaller installations may share the same data store for visualizations, visualization collections, visualization data, user data, or the like, as well as information associated with detecting anomalies in visualizations.

Next, in one or more of the various embodiments, control may be returned to a calling process.

Figure 7:
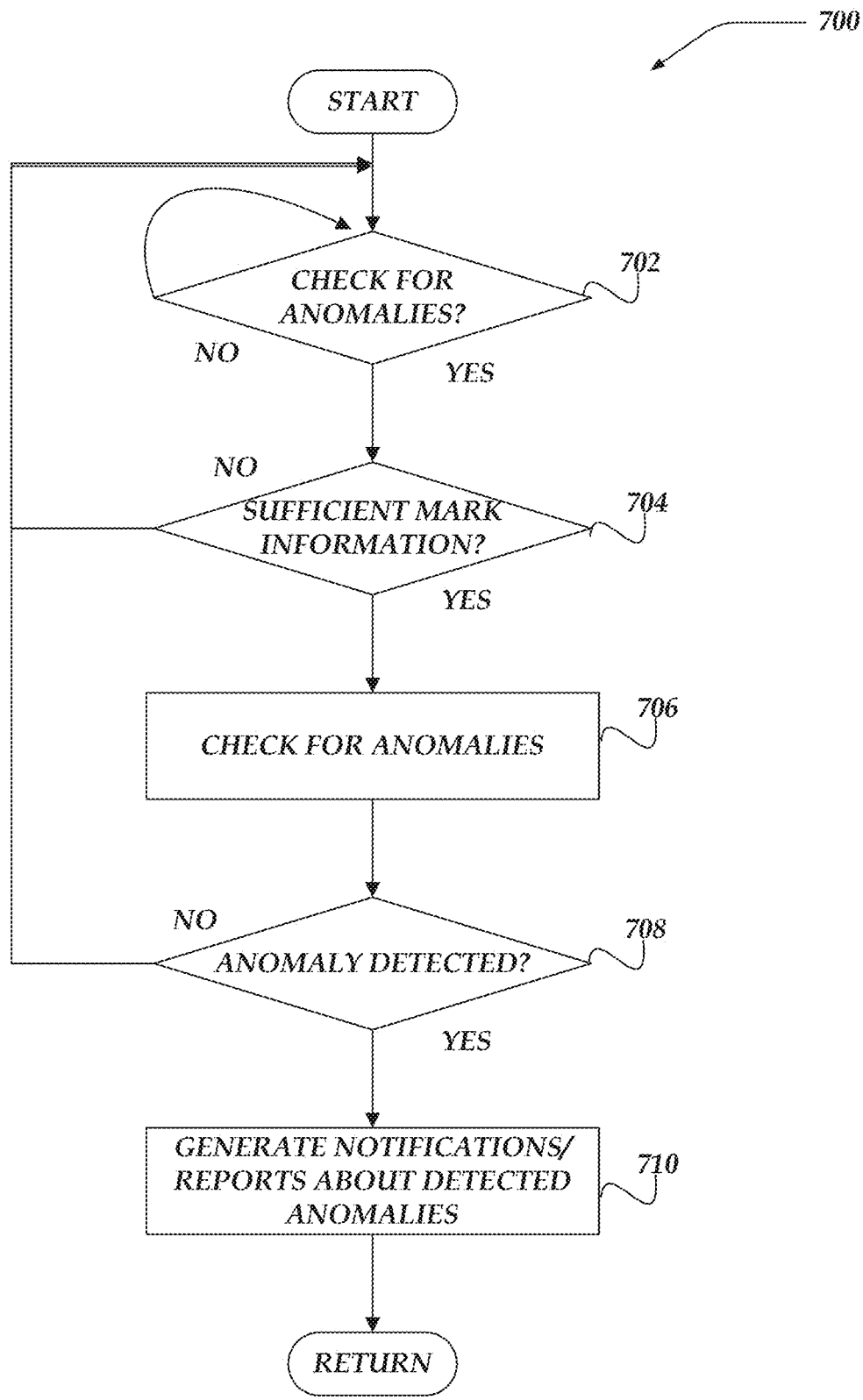
FIG. 7 illustrates a flowchart of a process for detecting anomalies in visualizations in accordance with one or more of the various embodiments.

FIG. 7 illustrates a flowchart of process 700 for detecting anomalies in visualizations in accordance with one or more of the various embodiments. After a start block, at decision block 702, in one or more of the various embodiments, if an analysis engine determines that one or more monitored visualizations may be checked for anomalies, control may flow to block 704; otherwise, control may loop back to decision block 702. As described above, in some embodiments, analysis engines may be arranged to periodically initiate a process to detect anomalies in visualizations, such as, checking every hour, every day, or the like. Accordingly, in some embodiments, analysis engines may be arranged to provide a default period, such as, hourly checks that may be determined from configuration information. Likewise, in some embodiments, analysis engines may be arranged to provide a user interface that enables administrators or other users to set the duration between anomaly checks. In some embodiments, analysis engines may be arranged to enable users or administrator to spontaneously initiate a process to detect anomalies in visualizations.

At decision block 704, in one or more of the various embodiments, if there may be sufficient mark information for the monitored visualizations, control may flow to block 706; otherwise, control may loop back decision block 702. As described above, analysis engines may be arranged to determine if there may be enough time-series mark information collected before attempting to discover anomalies. In some embodiments, different types of mark models may require different amounts of data before the models may be trained or fitted. In some embodiments, the model type may vary depending on the type of visualization or the data types of the mark values. Accordingly, in some embodiments, data requirements may vary depending on the type of mark model. Likewise, in some embodiments, data requirements may depend on user preferences. For example, in some cases, some users may requirement more precise results that other users that may require more data to be collected in some cases as compared to other cases. Accordingly, in some embodiments, analysis engines may be arranged to determine the required amount of sampled mark information based on configuration information to account for local requirements or local circumstances.

At block 706, in one or more of the various embodiments, analysis engines may be arranged to check for one or more anomalies in the one or more monitored visualizations. In some embodiments, analysis engines may be arranged employ one or more mark models to predict non-anomalous values for marks in the monitored visualizations. In some embodiments, more than one mark model may be used to check for different types of anomalies. In some embodiments, one or more mark models may be directed to identifying anomalous values, anomalous trends, absent values, or the like.

At decision block 708, in one or more of the various embodiments, if one or more anomalies may be detected, control may flow to block 710; otherwise, control may loop back to decision block 702. In one or more of the various embodiments, mark models may be trained to predict a range of values for each mark in a monitored visualization. Accordingly, in some embodiments, if an actual mark value for a monitored visualization falls outside of the predicted range of one or more mark models, analysis engine may be arranged to determine that the monitored visualization (or its values) may be anomalous.

At block 710, in one or more of the various embodiments, analysis engines may be arranged to generate one or more notification/reports associated with the detected anomalies or the monitored visualization. In some embodiments, reports/notifications may include associating user interface elements, such as, an icon (e.g., exclamation point, light bulb, bell shape, or the like), color changes, text, highlighting, or the like, with the monitored visualization that includes marks determined to be anomalous. Likewise, in some embodiments, if the monitored visualization may be included in a collection of visualizations (e.g., workbooks, dashboards, or the like), the notification indicators may be associated with the entire collection.

Also, in some embodiments, analysis engines may be arranged to generate hourly/daily/weekly/monthly digests that include information about the detected anomalies for the corresponding time period. Accordingly, such digests may be communicated to one or more users. In some embodiments, reports may be automatically provided to one or more users that may be associated with the monitored visualizations. Accordingly, in some embodiments, analysis engines may be arranged to provide user interfaces that enable users set personal or organization level communication rules. For example, some users may opt-out of receiving reports or notifications for one or more monitored visualizations. Likewise, in some embodiments, one or more users may be designated to receive anomaly reports for one or more monitored visualizations.

Next, in one or more of the various embodiments, control may be returned to a calling process.

Figure 8:
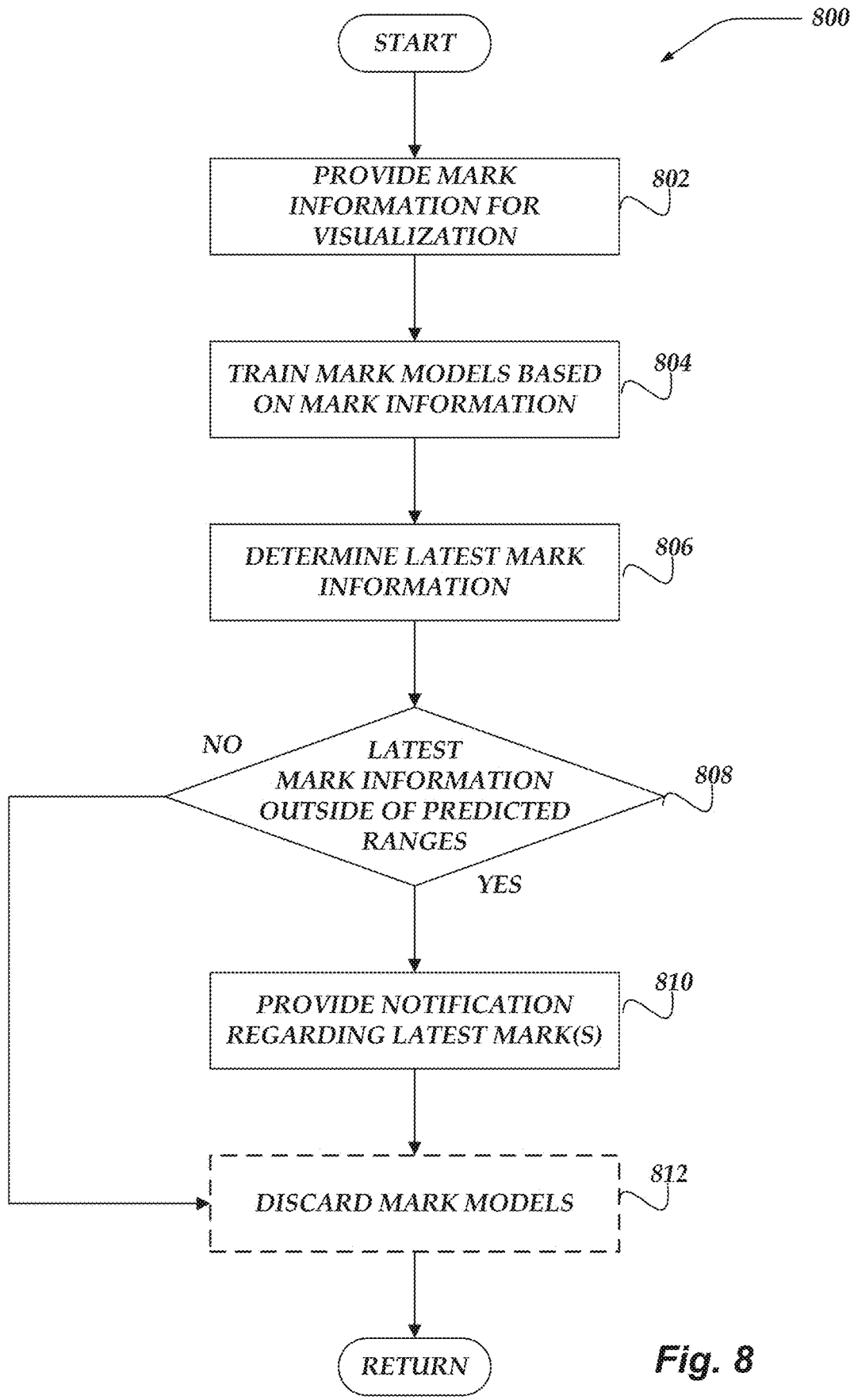
FIG. 8 illustrates a flowchart of a process for detecting anomalies in visualizations in accordance with one or more of the various embodiments.

FIG. 8 illustrates a flowchart of process 800 for detecting anomalies in visualizations in accordance with one or more of the various embodiments. After a start block, at block 802, in one or more of the various embodiments, analysis engines may be arranged to provide mark information for a visualization. As described above, analysis engines may be arranged to sample mark values from one or more monitored visualizations. Accordingly, in some embodiments, time-series values of the mark values may be collected and stored in a data store. In some embodiments, if visualizations have been selected for monitoring and if there may be sufficient mark information collected, analysis engines may be configured to periodically initiate anomaly detection.

In one or more of the various embodiments, analysis engines may be arranged to extract the sampled mark information from one or more data stores in preparation to search for anomalies.

At block 804, in one or more of the various embodiments, analysis engines may be arranged to train one or more mark models based on the mark information.

As described above, analysis engines may be arranged to generate and train mark models on-the-fly as part of the anomaly detection process. In some embodiments, different types of mark models may require different types of training. In some embodiments, one or more mark model types may be associated with the one or more types of visualizations or mark data types.

In some embodiments, one or more mark models may be based on two Gradient-Boosted Decision Tree models that may be set to fit the upper and lower bounds of mark values separately using Quantile Regression. Accordingly, in some embodiments, mark data/values may be represented as a feature vector of the values, the change from the previous value(s), date information (quarter, month, day of week), some trend and cycle-fitting features, or the like. However, one of ordinary skill in the art will appreciate that mark models may be adapted or tuned to support additional visualization types or analysis questions. Accordingly, in some embodiments, analysis engines may be arranged to determine the available mark model types and mark model training processes based on configuration information to account for local requirements or local circumstances. Likewise, in some embodiments, one or more different mark model types may be provided or otherwise made available based on other considerations, such as, licensing agreements, hosting environments (e.g., SaaS deployments versus on-premise deployments), computing resource availability, customer requirements (e.g., some model types may lack the required precision), or the like.

At block 806, in one or more of the various embodiments, analysis engines may be arranged to determine the latest mark information for the visualization. In one or more of the various embodiments, detecting anomalies in visualizations may be targeted to identify visualizations have an unexpected mark value as compared to past values. Thus, in some embodiments, analysis engines may be arranged to evaluate if the latest mark values conform to the range of values predicted by the mark models. In some embodiments, the latest mark values may include one or more values that were sampled since the attempt to detect anomalies.

At decision block 808, in one or more of the various embodiments, if the latest mark information has values may be outside of the predicted ranges, control may flow to block 810; otherwise, control may flow to block 812. As described above, mark models may predict a range of values for each mark in visualization, if the latest marks have values that may fall outside of the predicted range, analysis engines may be arranged to consider those mark value as anomalous.

At block 810, in one or more of the various embodiments, analysis engines may be arranged to provide one or more notification associated with the latest marks in the visualizations that may be outside of the ranges predicted by the one or more mark models.

At block 812, in one or more of the various embodiments, optionally, analysis engines may be arranged to discard the trained mark models. In some embodiments, analysis engines may be arranged to discard the trained mark models to reduce the performance costs associated with storing or managing the trained models.

In some embodiments, analysis engines may be arranged to retain one or more mark models for various reasons, such as, usage metrics, training difficulty, user preferences, or the like. For example, in some embodiments, analysis engines may be configured cache one or more mark model types depending on how often the same mark model may be required. However, in some embodiments, training and fitting mark models may be generally considered to be performant such that discarding the mark models after use may be advantageous.

Accordingly, in some embodiments, analysis engines may be arranged to employ rules, instructions, or the like, provided via configuration information to determine if a mark model may be discarded.

Note, in some embodiments, this block may be considered optional if the analysis engine may be configured to preserve the mark models.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Illustrated Operating Environment

Figure 9:
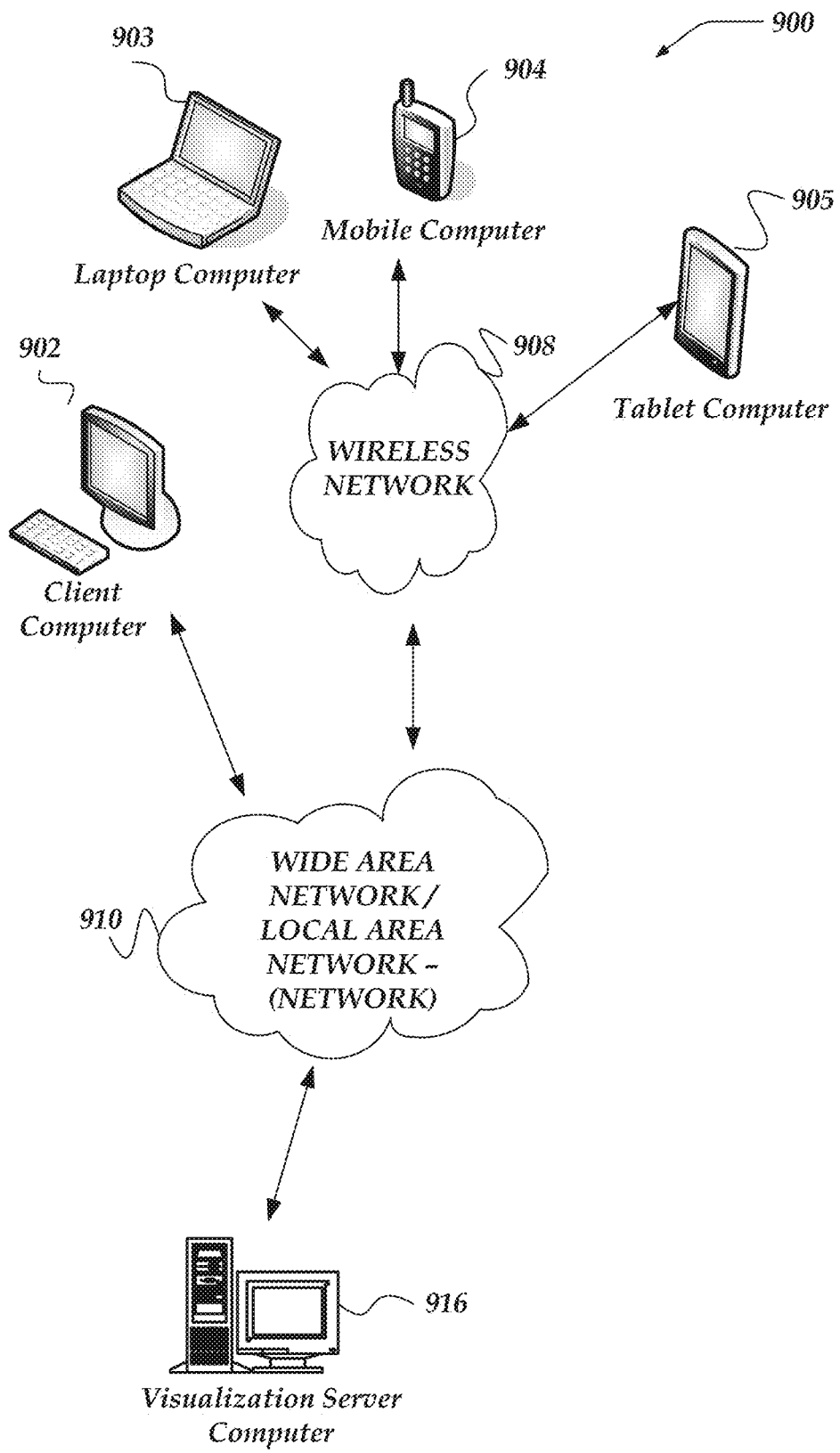
FIG. 9 illustrates a system environment in which various embodiments may be implemented.

FIG. 9 shows components of one embodiment of an environment in which embodiments of the invention may be practiced. Not all of the components may be required to practice the invention, and variations in the arrangement and type of the components may be made without departing from the spirit or scope of the invention. As shown, system 900 of FIG. 9 includes local area networks (LANs)/wide area networks (WANs)—(network) 910, wireless network 908, client computers 902-905, visualization server computer 916, or the like.

At least one embodiment of client computers 902-905 is described in more detail below in conjunction with FIG. 2. In one embodiment, at least some of client computers 902-905 may operate over one or more wired or wireless networks, such as networks 908, or 910. Generally, client computers 902-905 may include virtually any computer capable of communicating over a network to send and receive information, perform various online activities, offline actions, or the like. In one embodiment, one or more of client computers 902-905 may be configured to operate within a business or other entity to perform a variety of services for the business or other entity. For example, client computers 902-905 may be configured to operate as a web server, firewall, client application, media player, mobile telephone, game console, desktop computer, or the like. However, client computers 902-905 are not constrained to these services and may also be employed, for example, as for end-user computing in other embodiments. It should be recognized that more or less client computers (as shown in FIG. 9) may be included within a system such as described herein, and embodiments are therefore not constrained by the number or type of client computers employed.

Computers that may operate as client computer 902 may include computers that typically connect using a wired or wireless communications medium such as personal computers, multiprocessor systems, microprocessor-based or programmable electronic devices, network PCs, or the like. In some embodiments, client computers 902-905 may include virtually any portable computer capable of connecting to another computer and receiving information such as, laptop computer 903, mobile computer 904, tablet computers 905, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 902-905 typically range widely in terms of capabilities and features. Moreover, client computers 902-905 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 902-905 also may include at least one other client application that is configured to receive or send content between another computer. The client application may include a capability to send or receive content, or the like. The client application may further provide information that identifies itself, including a type, capability, name, and the like. In one embodiment, client computers 902-905 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 916, or other computers.

Client computers 902-905 may further be configured to include a client application that enables an end-user to log into an end-user account that may be managed by another computer, such as visualization server computer 916, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 916, or the like.

Wireless network 908 is configured to couple client computers 903-905 and its components with network 910. Wireless network 908 may include any of a variety of wireless sub-networks that may further overlay stand-alone ad-hoc networks, and the like, to provide an infrastructure-oriented connection for client computers 903-905. Such sub-networks may include mesh networks, Wireless LAN (WLAN) networks, cellular networks, and the like. In one embodiment, the system may include more than one wireless network.

Wireless network 908 may further include an autonomous system of terminals, gateways, routers, and the like connected by wireless radio links, and the like. These connectors may be configured to move freely and randomly and organize themselves arbitrarily, such that the topology of wireless network 908 may change rapidly.

Wireless network 908 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 903-905 with various degrees of mobility. In one non-limiting example, wireless network 908 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 908 may include virtually any wireless communication mechanism by which information may travel between client computers 903-905 and another computer, network, a cloud-based network, a cloud instance, or the like.

Network 910 is configured to couple network computers with other computers, including, visualization server computer 916, client computers 902, and client computers 903-905 through wireless network 908, or the like. Network 910 is enabled to employ any form of computer readable media for communicating information from one electronic device to another. Also, network 910 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 910 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 916 is described in more detail below in conjunction with FIG. 11. Although FIG. 9 illustrates visualization server computer 916 or the like, as a single computer, the innovations or embodiments are not so limited. For example, one or more functions of visualization server computer 916, or the like, may be distributed across one or more distinct network computers. Moreover, in one or more embodiments, visualization server computer 916 may be implemented using a plurality of network computers. Further, in one or more of the various embodiments, visualization server computer 916, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 10:
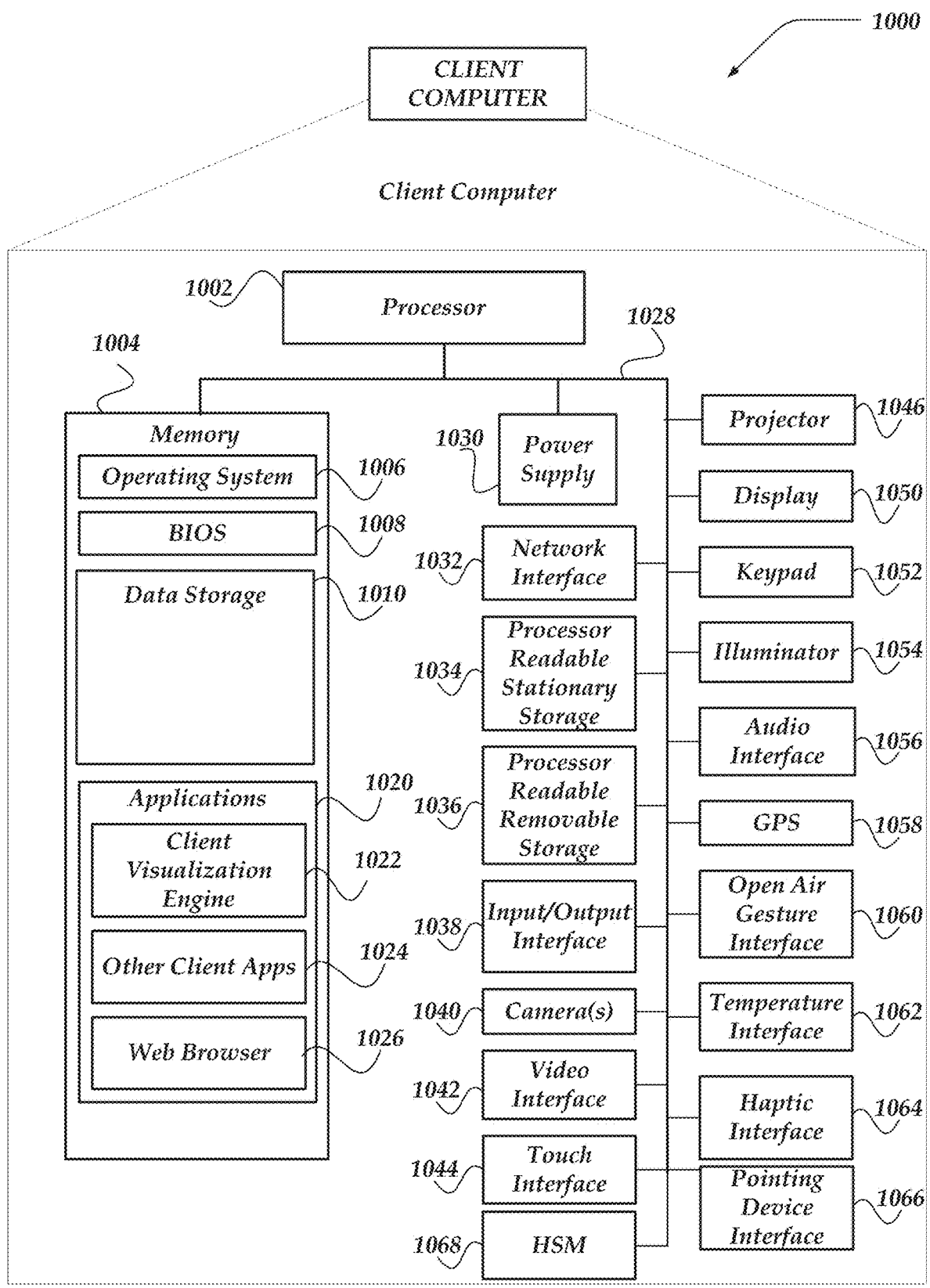
FIG. 10 illustrates a schematic embodiment of a client computer.

FIG. 10 shows one embodiment of client computer 1000 that may include many more or less components than those shown. Client computer 1000 may represent, for example, one or more embodiment of mobile computers or client computers shown in FIG. 9.

Client computer 1000 may include processor 1002 in communication with memory 1004 via bus 1028. Client computer 1000 may also include power supply 1030, network interface 1032, audio interface 1056, display 1050, keypad 1052, illuminator 1054, video interface 1042, input/output interface 1038, haptic interface 1064, global positioning systems (GPS) receiver 1058, open air gesture interface 1060, temperature interface 1062, camera(s) 1040, projector 1046, pointing device interface 1066, processor-readable stationary storage device 1034, and processor-readable removable storage device 1036. Client computer 1000 may optionally communicate with a base station (not shown), or directly with another computer. And in one embodiment, although not shown, a gyroscope may be employed within client computer 1000 to measuring or maintaining an orientation of client computer 1000.

Power supply 1030 may provide power to client computer 1000. A rechargeable or non-rechargeable battery may be used to provide power. The power may also be provided by an external power source, such as an AC adapter or a powered docking cradle that supplements or recharges the battery.

Network interface 1032 includes circuitry for coupling client computer 1000 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 1032 is sometimes known as a transceiver, transceiving device, or network interface card (MC).

Audio interface 1056 may be arranged to produce and receive audio signals such as the sound of a human voice. For example, audio interface 1056 may be coupled to a speaker and microphone (not shown) to enable telecommunication with others or generate an audio acknowledgment for some action. A microphone in audio interface 1056 can also be used for input to or control of client computer 1000, e.g., using voice recognition, detecting touch based on sound, and the like.

Display 1050 may be a liquid crystal display (LCD), gas plasma, electronic ink, light emitting diode (LED), Organic LED (OLED) or any other type of light reflective or light transmissive display that can be used with a computer. Display 1050 may also include a touch interface 1044 arranged to receive input from an object such as a stylus or a digit from a human hand, and may use resistive, capacitive, surface acoustic wave (SAW), infrared, radar, or other technologies to sense touch or gestures.

Projector 1046 may be a remote handheld projector or an integrated projector that is capable of projecting an image on a remote wall or any other reflective object such as a remote screen.

Video interface 1042 may be arranged to capture video images, such as a still photo, a video segment, an infrared video, or the like. For example, video interface 1042 may be coupled to a digital video camera, a web-camera, or the like. Video interface 1042 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 1052 may comprise any input device arranged to receive input from a user. For example, keypad 1052 may include a push button numeric dial, or a keyboard. Keypad 1052 may also include command buttons that are associated with selecting and sending images.

Illuminator 1054 may provide a status indication or provide light. Illuminator 1054 may remain active for specific periods of time or in response to event messages. For example, when illuminator 1054 is active, it may back-light the buttons on keypad 1052 and stay on while the client computer is powered. Also, illuminator 1054 may back-light these buttons in various patterns when particular actions are performed, such as dialing another client computer. Illuminator 1054 may also cause light sources positioned within a transparent or translucent case of the client computer to illuminate in response to actions.

Further, client computer 1000 may also comprise hardware security module (HSM) 1068 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 1068 may be a stand-alone computer, in other cases, HSM 1068 may be arranged as a hardware card that may be added to a client computer.

Client computer 1000 may also comprise input/output interface 1038 for communicating with external peripheral devices or other computers such as other client computers and network computers. The peripheral devices may include an audio headset, virtual reality headsets, display screen glasses, remote speaker system, remote speaker and microphone system, and the like. Input/output interface 1038 can utilize one or more technologies, such as Universal Serial Bus (USB), Infrared, WiFi, WiMax, Bluetooth™, and the like.

Input/output interface 1038 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 1000.

Haptic interface 1064 may be arranged to provide tactile feedback to a user of the client computer. For example, the haptic interface 1064 may be employed to vibrate client computer 1000 in a particular way when another user of a computer is calling. Temperature interface 1062 may be used to provide a temperature measurement input or a temperature changing output to a user of client computer 1000. Open air gesture interface 1060 may sense physical gestures of a user of client computer 1000, for example, by using single or stereo video cameras, radar, a gyroscopic sensor inside a computer held or worn by the user, or the like. Camera 1040 may be used to track physical eye movements of a user of client computer 1000.

GPS transceiver 1058 can determine the physical coordinates of client computer 1000 on the surface of the Earth, which typically outputs a location as latitude and longitude values. GPS transceiver 1058 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 1000 on the surface of the Earth. It is understood that under different conditions, GPS transceiver 1058 can determine a physical location for client computer 1000. In one or more embodiments, however, client computer 1000 may, through other components, provide other information that may be employed to determine a physical location of the client computer, including for example, a Media Access Control (MAC) address, IP address, and the like.

In at least one of the various embodiments, applications, such as, operating system 1006, visualization client 1022, other client apps 1024, web browser 1026, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 1058. Also, in some embodiments, geolocation information may include information provided using one or more geolocation protocols over the networks, such as, wireless network 108 or network 111.

Human interface components can be peripheral devices that are physically separate from client computer 1000, allowing for remote input or output to client computer 1000. For example, information routed as described here through human interface components such as display 1050 or keyboard 1052 can instead be routed through network interface 1032 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 1026 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 1004 may include RAM, ROM, or other types of memory. Memory 1004 illustrates an example of computer-readable storage media (devices) for storage of information such as computer-readable instructions, data structures, program modules or other data. Memory 1004 may store BIOS 1008 for controlling low-level operation of client computer 1000. The memory may also store operating system 1006 for controlling the operation of client computer 1000. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 1004 may further include one or more data storage 1010, which can be utilized by client computer 1000 to store, among other things, applications 1020 or other data. For example, data storage 1010 may also be employed to store information that describes various capabilities of client computer 1000. The information may then be provided to another device or computer based on any of a variety of methods, including being sent as part of a header during a communication, sent upon request, or the like. Data storage 1010 may also be employed to store social networking information including address books, buddy lists, aliases, user profile information, or the like. Data storage 1010 may further include program code, data, algorithms, and the like, for use by a processor, such as processor 1002 to execute and perform actions. In one embodiment, at least some of data storage 1010 might also be stored on another component of client computer 1000, including, but not limited to, non-transitory processor-readable removable storage device 1036, processor-readable stationary storage device 1034, or even external to the client computer.

Applications 1020 may include computer executable instructions which, when executed by client computer 1000, transmit, receive, or otherwise process instructions and data. Applications 1020 may include, for example, visualization client 1022, other client applications 1024, web browser 1026, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 1000 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 1000 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 11:
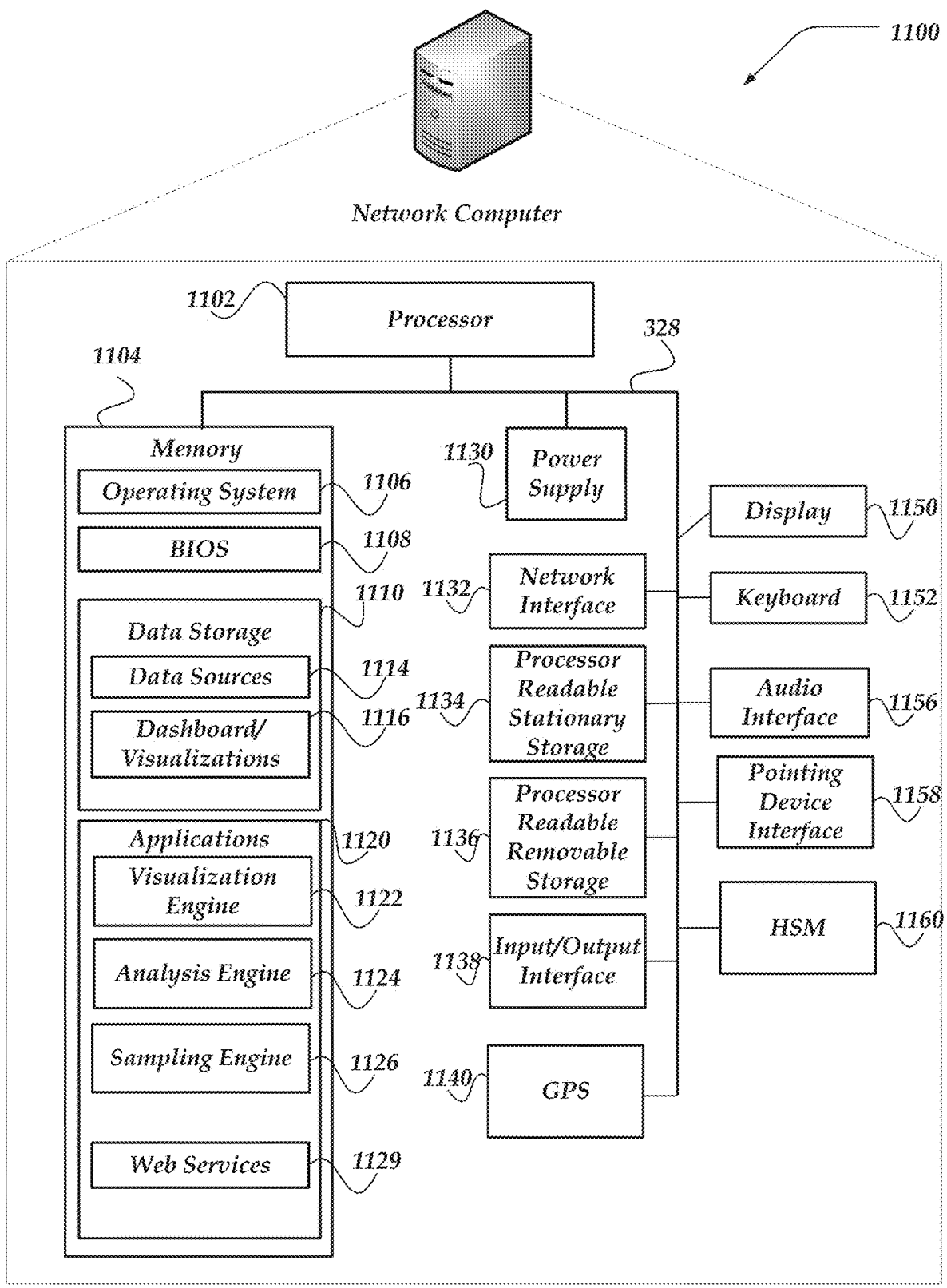
FIG. 11 illustrates a schematic embodiment of a network computer.

FIG. 11 shows one embodiment of network computer 1100 that may be included in a system implementing one or more of the various embodiments. Network computer 1100 may include many more or less components than those shown in FIG. 11. However, the components shown are sufficient to disclose an illustrative embodiment for practicing these innovations. Network computer 1100 may represent, for example, one embodiment of at least one of visualization server computer 916, or the like, of FIG. 9.

Network computers, such as, network computer 1100 may include a processor 1102 that may be in communication with a memory 1104 via a bus 1128. In some embodiments, processor 1102 may be comprised of one or more hardware processors, or one or more processor cores. In some cases, one or more of the one or more processors may be specialized processors designed to perform one or more specialized actions, such as, those described herein. Network computer 1100 also includes a power supply 1130, network interface 1132, audio interface 1156, display 1150, keyboard 1152, input/output interface 1138, processor-readable stationary storage device 1134, and processor-readable removable storage device 1136. Power supply 1130 provides power to network computer 1100.

Network interface 1132 includes circuitry for coupling network computer 1100 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 1132 is sometimes known as a transceiver, transceiving device, or network interface card (NIC). Network computer 1100 may optionally communicate with a base station (not shown), or directly with another computer.

Audio interface 1156 is arranged to produce and receive audio signals such as the sound of a human voice. For example, audio interface 1156 may be coupled to a speaker and microphone (not shown) to enable telecommunication with others or generate an audio acknowledgment for some action. A microphone in audio interface 1156 can also be used for input to or control of network computer 1100, for example, using voice recognition.

Display 1150 may be a liquid crystal display (LCD), gas plasma, electronic ink, light emitting diode (LED), Organic LED (OLED) or any other type of light reflective or light transmissive display that can be used with a computer. In some embodiments, display 1150 may be a handheld projector or pico projector capable of projecting an image on a wall or other object.

Network computer 1100 may also comprise input/output interface 1138 for communicating with external devices or computers not shown in FIG. 11. Input/output interface 1138 can utilize one or more wired or wireless communication technologies, such as USB™, Firewire™ WiFi, WiMax, Thunderbolt™, Infrared, Bluetooth™, Zigbee™, serial port, parallel port, and the like.

Also, input/output interface 1138 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 1100. Human interface components can be physically separate from network computer 1100, allowing for remote input or output to network computer 1100. For example, information routed as described here through human interface components such as display 1150 or keyboard 1152 can instead be routed through the network interface 1132 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 1158 to receive user input.

GPS transceiver 1140 can determine the physical coordinates of network computer 1100 on the surface of the Earth, which typically outputs a location as latitude and longitude values. GPS transceiver 1140 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 1100 on the surface of the Earth. It is understood that under different conditions, GPS transceiver 1140 can determine a physical location for network computer 1100. In one or more embodiments, however, network computer 1100 may, through other components, provide other information that may be employed to determine a physical location of the client computer, including for example, a Media Access Control (MAC) address, IP address, and the like.

In at least one of the various embodiments, applications, such as, operating system 1106, visualization engine 1122, analysis engine 1124, sampling engine 1126, other applications 1129, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 1140. Also, in some embodiments, geolocation information may include information provided using one or more geolocation protocols over the networks, such as, wireless network 108 or network 111.

Memory 1104 may include Random Access Memory (RAM), Read-Only Memory (ROM), or other types of memory. Memory 1104 illustrates an example of computer-readable storage media (devices) for storage of information such as computer-readable instructions, data structures, program modules or other data. Memory 1104 stores a basic input/output system (BIOS) 1108 for controlling low-level operation of network computer 1100. The memory also stores an operating system 1106 for controlling the operation of network computer 1100. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 1104 may further include one or more data storage 1110, which can be utilized by network computer 1100 to store, among other things, applications 1120 or other data. For example, data storage 1110 may also be employed to store information that describes various capabilities of network computer 1100. The information may then be provided to another device or computer based on any of a variety of methods, including being sent as part of a header during a communication, sent upon request, or the like. Data storage 1110 may also be employed to store social networking information including address books, buddy lists, aliases, user profile information, or the like. Data storage 1110 may further include program code, data, algorithms, and the like, for use by a processor, such as processor 1102 to execute and perform actions such as those actions described below. In one embodiment, at least some of data storage 1110 might also be stored on another component of network computer 1100, including, but not limited to, non-transitory media inside processor-readable removable storage device 1136, processor-readable stationary storage device 1134, or any other computer-readable storage device within network computer 1100, or even external to network computer 1100. Data storage 1110 may include, for example, data sources 1114, dashboards/visualizations 1116, or the like.

Applications 1120 may include computer executable instructions which, when executed by network computer 1100, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 1120 may include visualization engine 1122, analysis engine 1124, sampling engine 1126, other applications 1129, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, visualization engine 1122, analysis engine 1124, sampling engine 1126, other applications 1129, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to visualization engine 1122, analysis engine 1124, sampling engine 1126, other applications 1129, or the like, may be provisioned and de-commissioned automatically.

Also, in one or more of the various embodiments, visualization engine 1122, analysis engine 1124, sampling engine 1126, other applications 1129, or the like, may be located in virtual servers running in a cloud-based computing environment rather than being tied to one or more specific physical network computers.

Further, network computer 1100 may also comprise hardware security module (HSM) 1160 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 1160 may be a stand-alone network computer, in other cases, HSM 1160 may be arranged as a hardware card that may be installed in a network computer.

Additionally, in one or more embodiments (not shown in the figures), network computer 1100 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing visualizations of data using one or more processors that are configured to execute instructions, wherein the execution of the instructions performs actions, comprising:
   providing, for display to one or more users, a plurality of visualizations based on data from one or more data sources, wherein each visualization is a visual representation of data that includes a plurality of graphical marks that are associated with one or more values from the one or more data sources; and
   automatically performing, without user input:
      determining one or more monitored visualizations from the plurality of visualizations based on one or more metrics associated with the one or more monitored visualizations;
      sampling one or more mark values from each monitored visualization, wherein the one or more sampled mark values are stored with a timestamp that corresponds to a time that the one or more mark values are sampled; and in response to an amount of the one or more sampled mark values for a monitored visualization being greater than a threshold value:

training one or more mark models to classify a portion of the one or more sampled mark values associated with the monitored visualization, wherein the one or more mark models predict one or more ranges of values for the one or more classified mark values associated with the monitored visualization; and in response to the portion of the one or more classified mark values associated with the monitored visualization having a value that is outside of the one or more predicted range values, providing an indication that the monitored visualization is associated with an anomalous mark value, wherein the indication is displayed to the one or more users.

2. The method of claim 1, further comprising:

monitoring activity associated with the plurality of visualizations, wherein the monitored activity is one or more of a frequency of access, a number of times a visualization is favorited, a number of users that register to follow a visualization, or a number of times a visualization is included in a dashboard; and determining one or more values for the one or more metrics based on the monitored activity.

3. The method of claim 1, further comprising:

excluding a portion of the plurality of visualizations from the one or more monitored visualizations based on one or more characteristics of the excluded portion of visualizations, wherein the one or more characteristics include one or more of a number of graphical marks in the excluded portion of visualizations, a license associated with the excluded portion of visualizations, a user preference, a data type included in the excluded portion of visualizations, or a visualization type of the excluded portion of visualizations.

4. The method of claim 1, further comprising:

generating the one or more mark models based on Gradient-Boosted Decision Tree models that are set to fit an upper bound and a lower bound separately using quantile regression, wherein information corresponding to the one or more sampled mark values is represented as a feature vector, and wherein the feature vectors include one or more of a mark value, a change from a previous value, or date information.

5. The method of claim 1, wherein training the one or more mark models to classify the portion of the one or more sampled mark values associated with the monitored visualization further comprises:

training one or more different mark models for the monitored visualization, wherein each different mark model is directed to classifying one or more different types of anomalies for the monitored visualization.

6. The method of claim 1, further comprising:

discarding the one or more trained mark models; and retraining the one or more trained mark models for subsequent prediction of range of values for graphical marks in the monitored visualization.

7. The method of claim 1, wherein sampling the one or more mark values from each monitored visualization further comprises storing the one or more sampled mark values in another data source that is separate from the one or more data sources.

8. A non-transitory computer-readable storage media that includes instructions for managing visualizations of data, wherein execution of the instructions by one or more processors performs actions, comprising:

providing, for display to one or more users, a plurality of visualizations based on data from one or more data sources, wherein each visualization is a visual representation of data that includes a plurality of graphical marks that are associated with one or more values from the one or more data sources; and automatically performing, without user input:

determining one or more monitored visualizations from the plurality of visualizations based on one or more metrics associated with the one or more monitored visualizations;

sampling one or more mark values from each monitored visualization, wherein the one or more sampled mark values are stored with a timestamp that corresponds to a time that the one or more mark values are sampled; and in response to an amount of the one or more sampled mark values for a monitored visualization being greater than a threshold value:

training one or more mark models to classify a portion of the one or more sampled mark values associated with the monitored visualization, wherein the one or more mark models predict one or more ranges of values for the one or more classified mark values associated with the monitored visualization; and in response to the portion of the one or more classified mark values associated with the monitored visualization having a value that is outside of the one or more predicted range values, providing an indication that the monitored visualization is associated with an anomalous mark value, wherein the indication is displayed to the one or more users.

9. The media of claim 8, further comprising:

monitoring activity associated with the plurality of visualizations, wherein the monitored activity is one or more of a frequency of access, a number of times a visualization is favorited, a number of users that register to follow a visualization, or a number of times a visualization is included in a dashboard; and determining one or more values for the one or more metrics based on the monitored activity.

10. The media of claim 8, further comprising:

excluding a portion of the plurality of visualizations from the one or more monitored visualizations based on one or more characteristics of the excluded portion of visualizations, wherein the one or more characteristics include one or more of a number of graphical marks in the excluded portion of visualizations, a license associated with the excluded portion of visualizations, a user preference, a data type included in the excluded portion of visualizations, or a visualization type of the excluded portion of visualizations.

11. The media of claim 8, further comprising:

generating the one or more mark models based on Gradient-Boosted Decision Tree models that are set to fit an upper bound and a lower bound separately using quantile regression, wherein information corresponding to the one or more sampled mark values is represented as a feature vector, and wherein the feature vectors include one or more of a mark value, a change from a previous value, or date information.

12. The media of claim 8, further comprising:
training one or more different mark models for the monitored visualization, wherein each different mark model is directed to classifying one or more different types of anomalies for the monitored visualization.

13. The media of claim 8, wherein predicting the one or more ranges of values for the one or more classified mark values associated with the monitored visualization further comprises:
discarding the one or more trained mark models; and
retraining the one or more trained mark models for subsequent prediction of range of values for graphical marks in the monitored visualization.

14. The media of claim 8, wherein sampling the one or more mark values from each monitored visualization further comprises storing the one or more sampled mark values in another data source that is separate from the one or more data sources.

15. A system for managing visualizations, comprising:
a network computer, comprising:
a memory that stores at least instructions; and
one or more processors that execute instructions that perform actions, including:
providing, for display to one or more users, a plurality of visualizations based on data from one or more data sources, wherein each visualization is a visual representation of data that includes a plurality of graphical marks that are associated with one or more values from the one or more data sources; and
automatically performing, without user input:
determining one or more monitored visualizations from the plurality of visualizations based on one or more metrics associated with the one or more monitored visualizations;
sampling one or more mark values from each monitored visualization, wherein the one or more sampled mark values are stored with a timestamp that corresponds to a time of that the one or more mark values are sampled; and
in response to an amount of the one or more sampled mark values for a monitored visualization being greater than a threshold value:
training one or more mark models to classify a portion of the one or more sampled mark values associated with the monitored visualization, wherein the one or more mark models predict one or more ranges of values for the one or more classified mark values associated with the monitored visualization; and
in response to the portion of the one or more classified mark values associated with the monitored visualization having a value that is outside of the one or more predicted range values, providing an indication that the monitored visualization is associated with an anomalous mark value, wherein the indication is displayed to the one or more users; and
a client computer, comprising:
a memory that stores at least instructions; and
one or more processors that execute instructions that perform actions, including:
displaying one or more of the monitored visualization or the indication on a hardware display.

16. The system of claim 15, wherein the one or more processors of the network computer execute instructions that perform actions, further comprising:
monitoring activity associated with the plurality of visualizations, wherein the monitored activity is one or more of a frequency of access, a number of times a visualization is favorited, a number of users that register to follow a visualization, or a number of times a visualization is included in a dashboard; and
determining one or more values for the one or more metrics based on the monitored activity.

17. The system of claim 15, wherein the one or more processors of the network computer execute instructions that perform actions, further comprising:
excluding a portion of the plurality of visualizations from the one or more monitored visualizations based on one or more characteristics of the excluded portion of visualizations, wherein the one or more characteristics include one or more of a number of graphical marks in the excluded portion of visualizations, a license associated with the excluded portion of visualizations, a user preference, a data type included in the excluded portion of visualizations, or a visualization type of the excluded portion of visualizations.

18. The system of claim 15, wherein the one or more processors of the network computer execute instructions that perform actions, further comprising:
generating the one or more mark models based on Gradient-Boosted Decision Tree models that are set to fit an upper bound and a lower bound separately using quantile regression, wherein information corresponding to the one or more sampled mark values is represented as a feature vector, and wherein the feature vectors include one or more of a mark value, a change from a previous value, or date information.

19. The system of claim 15, wherein training the one or more mark models to classify the portion of the one or more sampled mark values associated with the monitored visualization further comprises:
training one or more different mark models for the monitored visualization, wherein each different mark model is directed to classifying one or more different types of anomalies for the monitored visualization.

20. The system of claim 15, further comprising:
discarding the one or more trained mark models; and
retraining the one or more trained mark models for subsequent prediction of range of values for graphical marks in the monitored visualization.

21. The method of claim 1, wherein each visualization is a graph.

* * * * *